Figure 1:
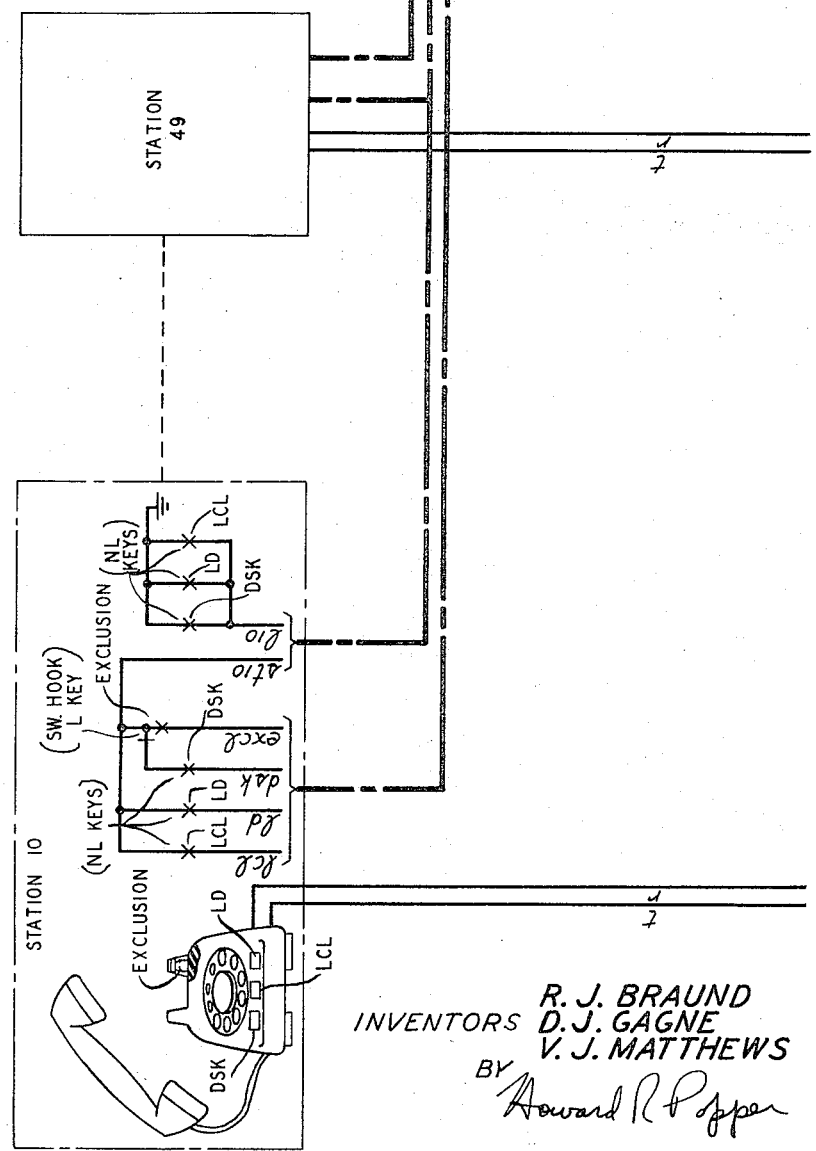
Figure 2:
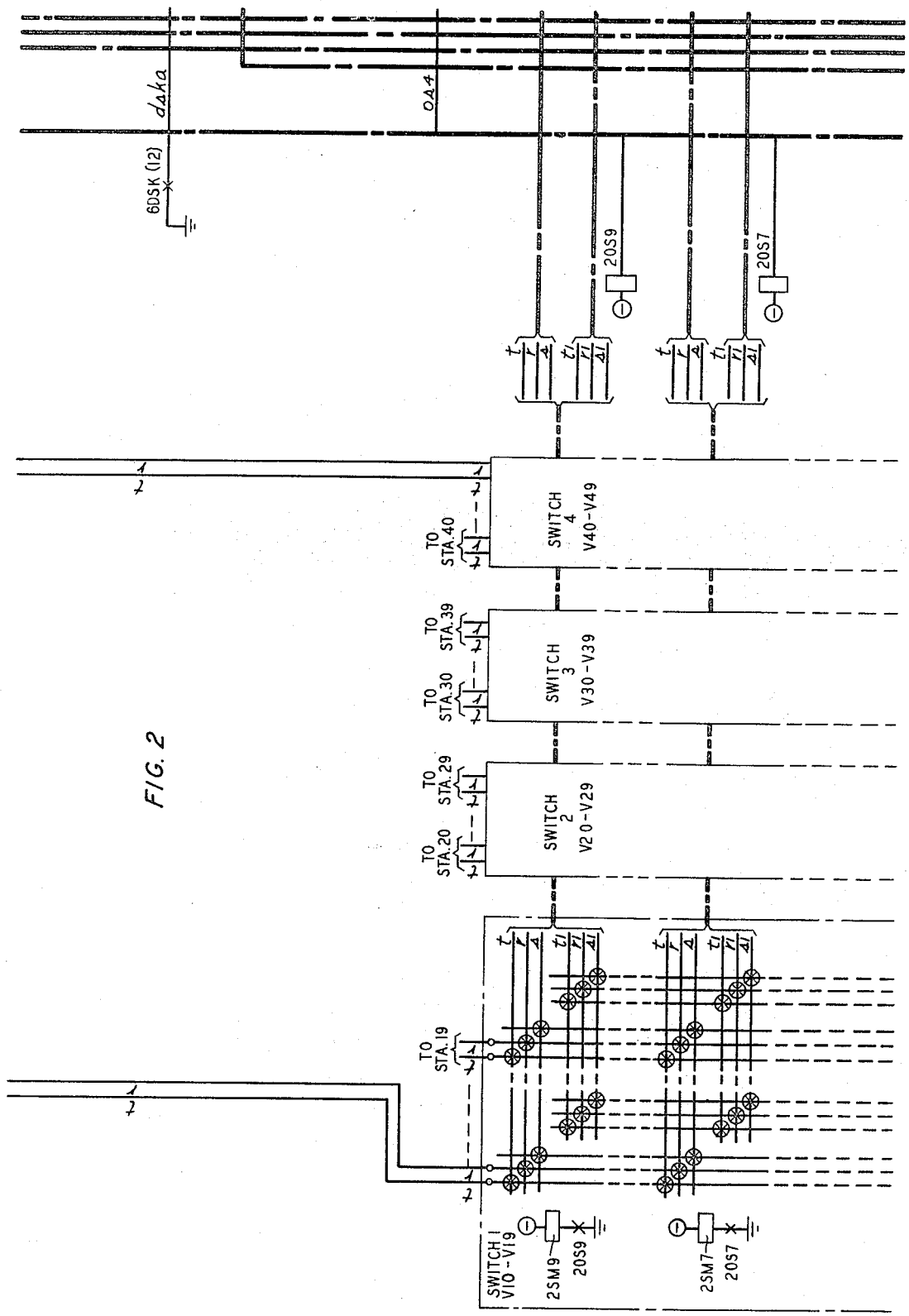
Figure 3:
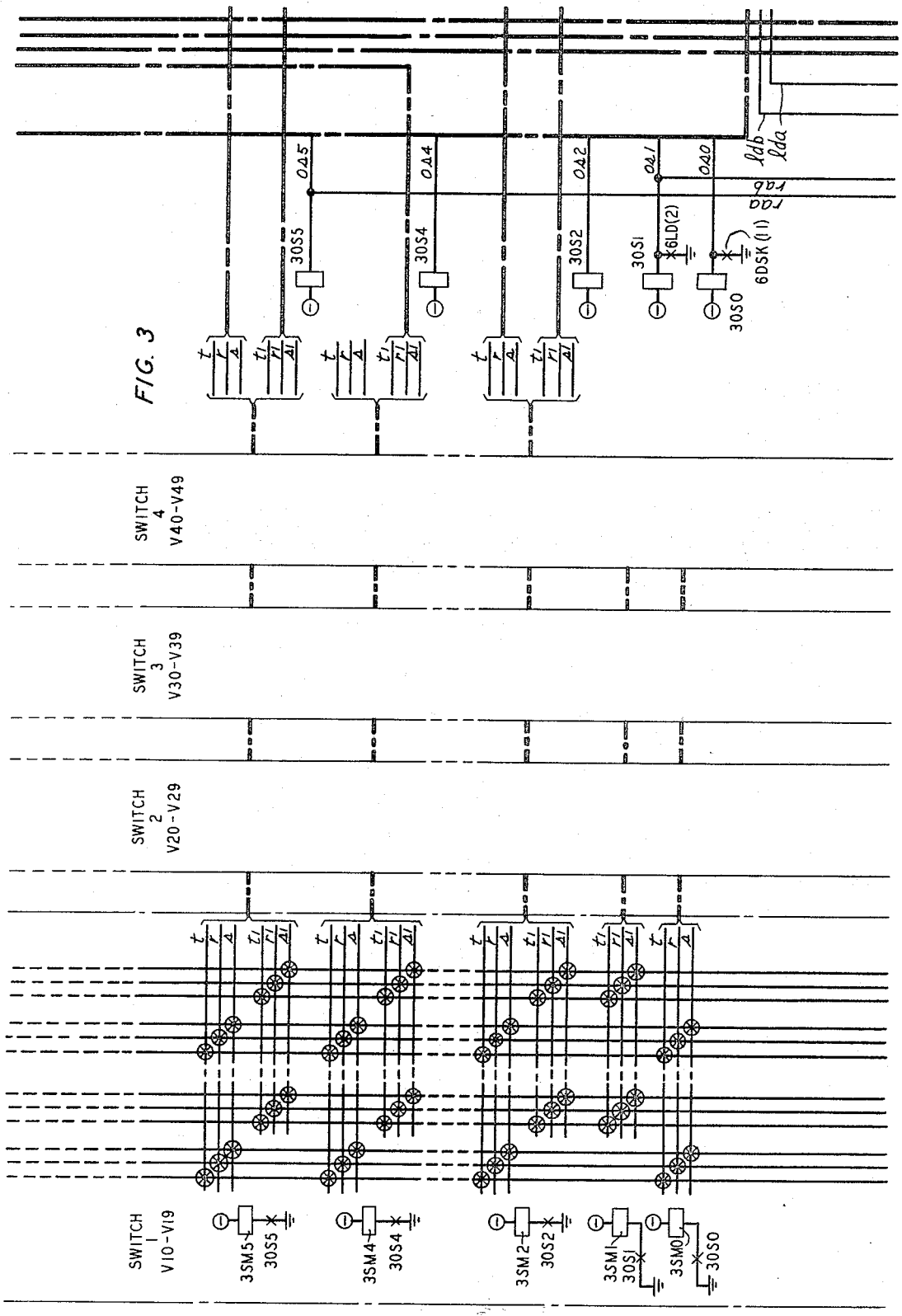
Figure 4:
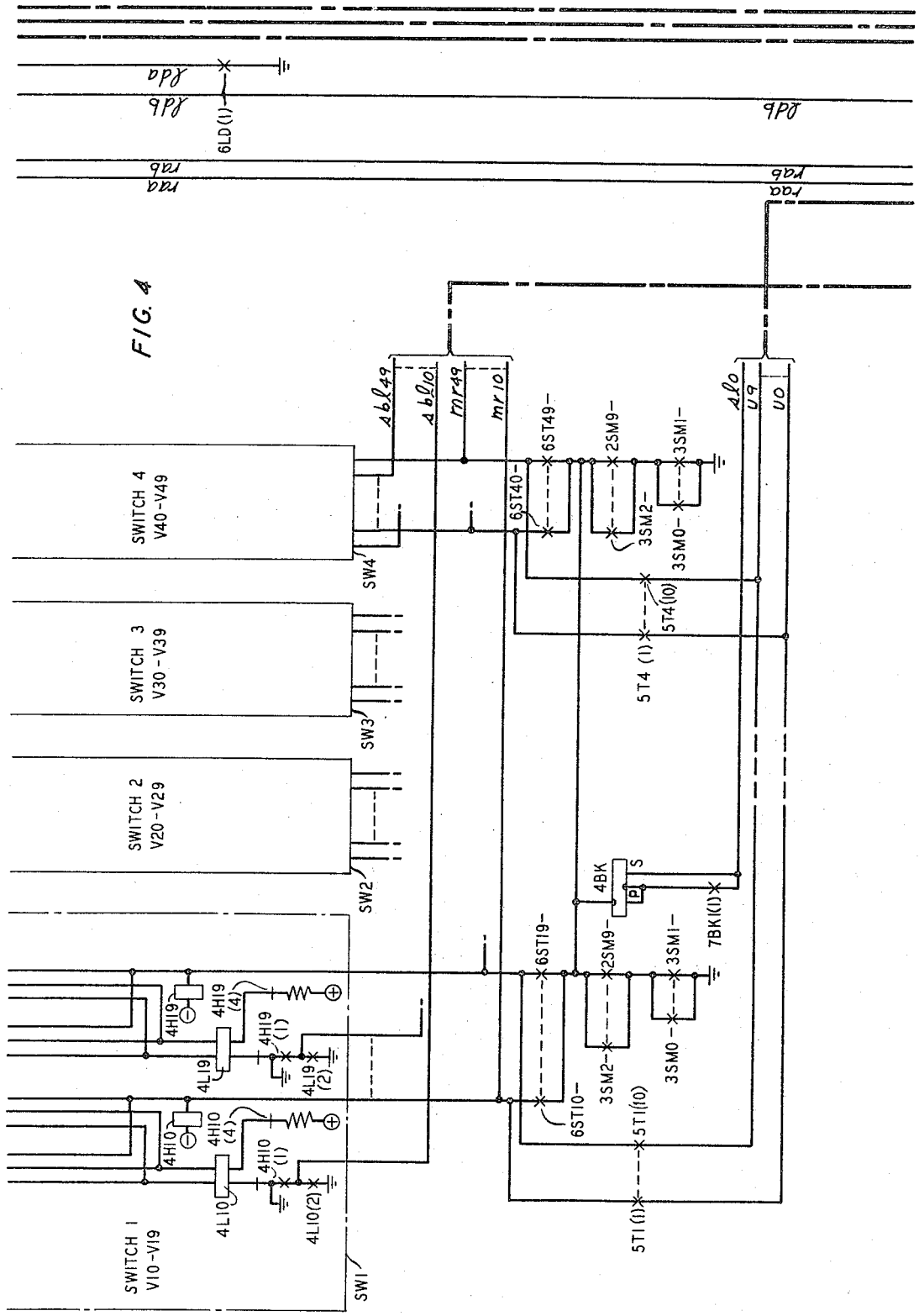

1ST 2-WAY CENTRAL OFFICE TRUNK CCT.

ANSWER TRUNK

United States Patent Office 3,327,064
Patented June 20, 1967

3,327,064
SMALL HOTEL-MOTEL PRIVATE BRANCH EXCHANGE
Reed J. Braund, Middletown, Donald J. Gagne, Brielle, and Vincent J. Matthews, Old Bridge, N.J., assignors to Bell Telephone Laboratories, Incorporated, New York, N.Y., a corporation of New York
Filed Jan. 6, 1964, Ser. No. 335,900
8 Claims. (Cl. 179—27)

This invention relates to telephone switching systems and more particularly to compact and inexpensive private branch exchanges for providing telephone service of the type required, for example, in small hotels, motels, and hospitals.

The type of telephone service required in the foregoing environments is somewhat different than that usually encountered when providing PBX service to industrial customers. Each telephone in a motel room, for example, will ordinarily be assigned for use by a transient customer who has little or no community of interest with any of the other telephone stations provided at the motel and, accordingly, traffic between stations of the "PBX" is practically negligible. On the other hand, considerable traffic may be incoming or outgoing between toll or local telephone central offices and any of the stations of a motel PBX. This contrasts to the situation obtaining in industrial PBX's where there is a high community of interest and therefore a large volume of intrastation traffic as well as large volumes of central office and toll traffic. Industrial PBX stations are therefore customarily equipped with dials so that they may operate dial switching equipment to establish intra-PBX and certain local central office switching connections. On the other hand, manual switchboards have heretofore been provided to serve the telephone needs of motel and small hotel customers because of low intrastation traffic did not justify the installation of automatic, dial-controlled switching equipment on the motel premises. As a consequence, the manual switchboard operator was required to handle any call involving one of the PBX stations. The cumbersome and tedious operation of manual equipment is a source of customer dissatisfaction and requires the use of a full-time operator, the expense of which often cannot be borne by the proprietor of a small motel.

It is another characteristic of the operation of small hotels, motels, etc., that the telephone switchboard must be left unattended while the office clerk or switchboard operator is required to visit the rooms to check on their readiness and suitability for guests. To handle calls incoming to a manual switchboard during these times would necessitate that the clerk start to return immediately to the office thereby neglecting his duties at the guest room and often arriving back at the desk too late to receive a call perhaps from a traveler desiring to place a reservation for one of the rooms.

Even while the clerk or switchboard operator at a manual PBX is engaged in operating the switchboard his duties may require that a call be held while another call is being placed or answered or while the clerk's attention is momentarily required for some other duty. Heretofore this has required the manipulation of cords and talking keys with the result that on occasion important calls were inadvertently lost.

Accordingly, it is an object of the present invention to provide an economical, compact, and easily operable switching system for providing improved telephone service for motels, hospitals, and for other telephone customers having similar requirements.

In accordance with the principles of the present invention, a private branch exchange is provided for a small motel by employing an attendant controlled crossbar switching system which permits any station to be used by the attendant for the answering and completion of incoming calls when the attendant is away from the console. The crossbar switching system also permits stations to originate outward local and toll calls without the assistance of the attendant, if so desired, by equipping each station with a key-button telephone set. Operation of the respective key for local or long distance trunks causes the crossbar switch to connect the station line with an idle one of the class of trunks desired. Similarly, operation of a "desk" key at the station operates the crossbar switch to connect the station line with an idle intercom trunk to the attendant console.

When the attendant console is occupied, incoming calls are accorded access to the attendant console one at a time independently of the crossbar switches so that they may be answered by the attendant. The attendant completes the call to the required station by depressing a direct station selection key which operates the crossbar switch to connect the calling trunk to the designated station. The attendant console is equipped with two hold keys permitting the attendant to place a first call in the holding condition to make or answer a second call and then to hold the second call in order to return to the first call. The placing of a call in the holding condition permits other calls to be accorded access to the attendant console on the one at a time basis. A calling trunk placed in the holding condition is again accorded access to the attendant console and the latter is re-established in answering relationship with the trunk by the attendant reoperating the same hold key as established the holding condition in the trunk. This re-entry by the attendant is accomplished irrespective of the presence of calls on other trunks which may have in the interim been accorded a higher degree of access preference to the attendant console than that initially accorded the trunk being re-answered.

When the attendant console will be unoccupied, the attendant conditions the crossbar switching system for remote operation on incoming calls by operating a remote answer key. Calling trunks thereafter continue to be accorded access to a common control portion of the attendant circuit on the one at a time basis (independently of the crossbar switches). The common control portion of the attendant circuit is extended by the operation of the remote answer key to a special answer trunk. The answer trunk causes a centrally located alarm or bell to operate upon the arrival of an incoming call to indicate its presence to the attendant at whatever station he may then be.

As previously mentioned, each station telephone set is equipped with trunk selection buttons, one of which, the "desk" button, is prepared by the attendant to perform a different function at this time. Each telephone station set advantageously is equipped with a switchhook secrecy or exclusion key of the type disclosed in D. H. King Patent 2,273,530, Feb. 17, 1942. The operation of the switchhook secrecy key by the attendant following the conditioning of the switching system for remote operation enables the desk key of the station telephone set to operate the crossbar switch to select the special answer trunk instead of an idle intercom trunk. The operation of the exclusion and desk keys in this manner prevents other stations from intercepting the call while permitting them to initiate calls to the "desk" as well as to outgoing trunks in the normal manner.

When the crossbar switch has been operated to place the remote answer station in answering relationship with the calling trunk, the attendant after conversing with the calling party may flash the switchhook and initiate for a sequence of opertaions in the special answer trunk permitting the attendant to dial the number of any other station to connect that station through the crossbar switch with the calling trunk.

In this regard it is to be noted that the expense of providing a conventional local automatic dial switching system capable of normally permitting all stations directly to dial each other is avoided through the use of the special answer trunk which permits only the particular station selected by the attendant to do so although any of the stations may be so selected at random.

In the event that the called station is busy, the special answer trunk is enabled to respond to the remote answer station's switchhook flash to re-establish the remote answering station in answering relationship with the calling trunk. The answer trunk also responds to switchhook flash following dialing to release the called station before answer and permit re-dialing.

Accordingly, a feature of the present invention is a crossbar private branch exchange system for small hotels which permits stations normally to control the crossbar switches for attendant and outgoing local and toll calls without dialing but which permits the attendant to use the dial of any station to complete incoming calls to other stations.

Another feature of the present invention is an answer trunk which may be selected by the attendant from any station for answering calls normally incoming to the attendant console.

A further feature of the present invention is an economical crossbar switching system in which stations having switchhook exclusion keys may be conditioned by the attendant for dial completion of incoming calls.

A still further feature of the present invention is an attendant console to which calling trunks are accorded access in a preference chain and by which an answered held trunk may be re-entered independently of the preference accorded any other of the calling trunks.

Figure 8:
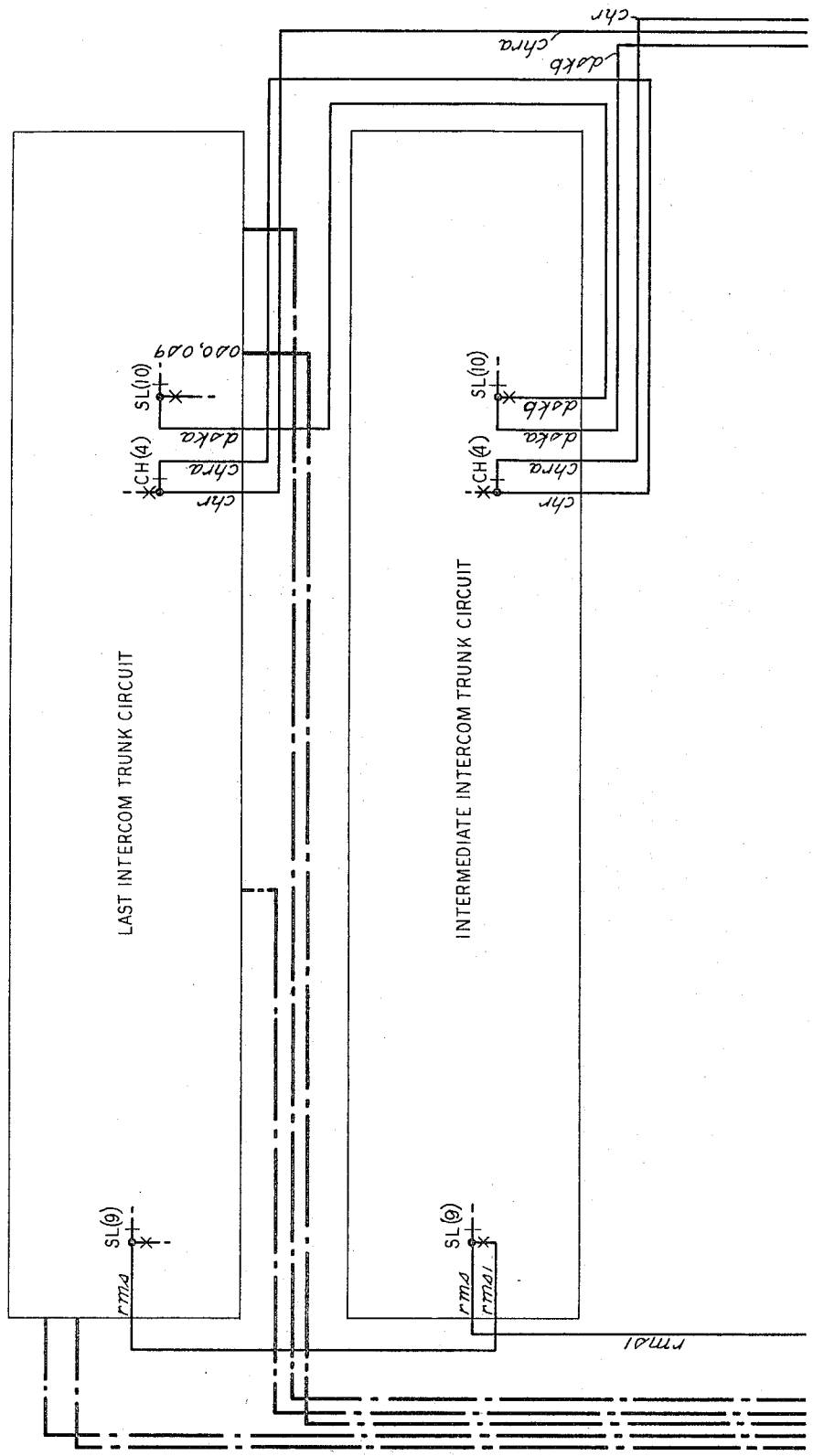
Figure 9:
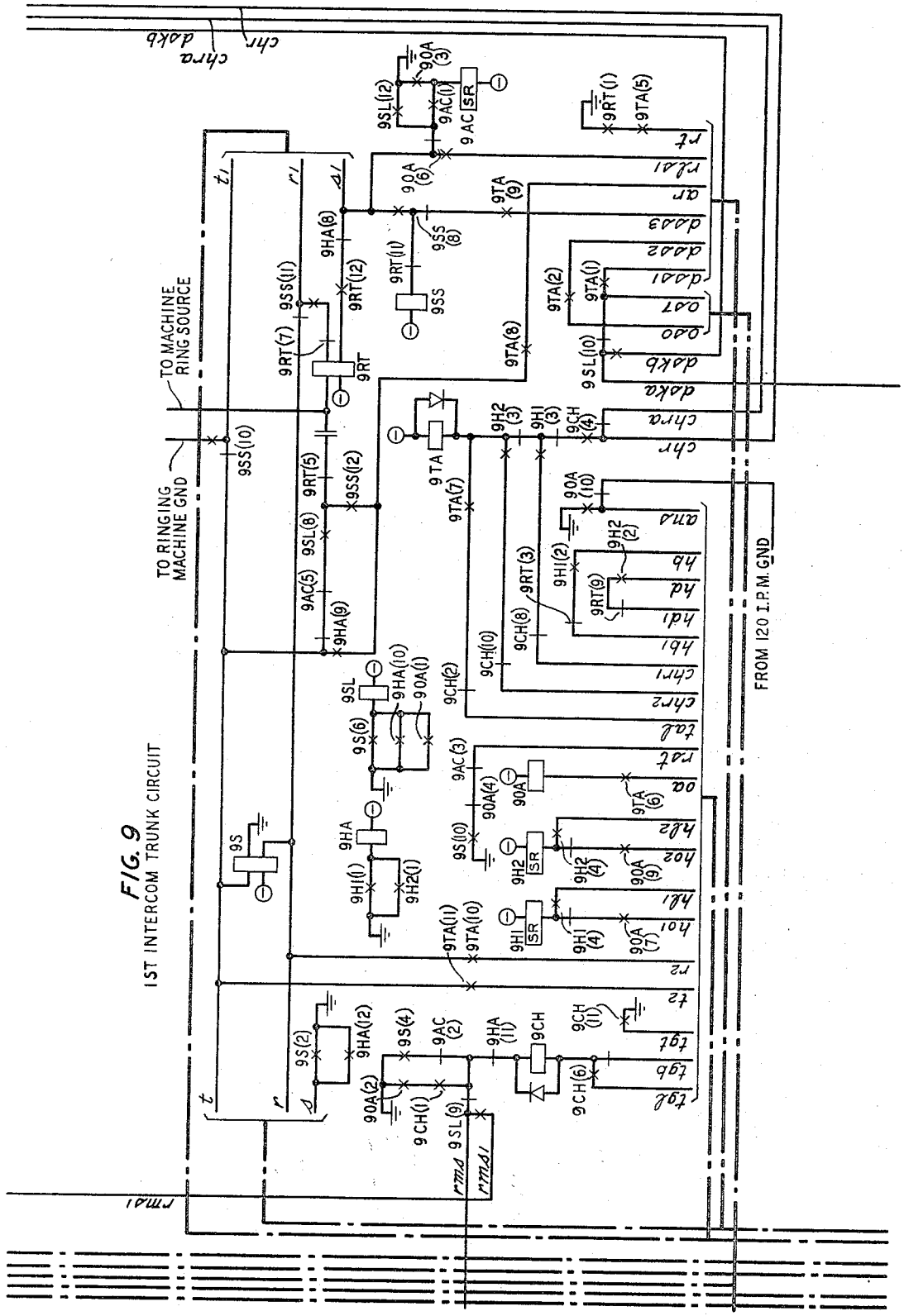
Figure 10:
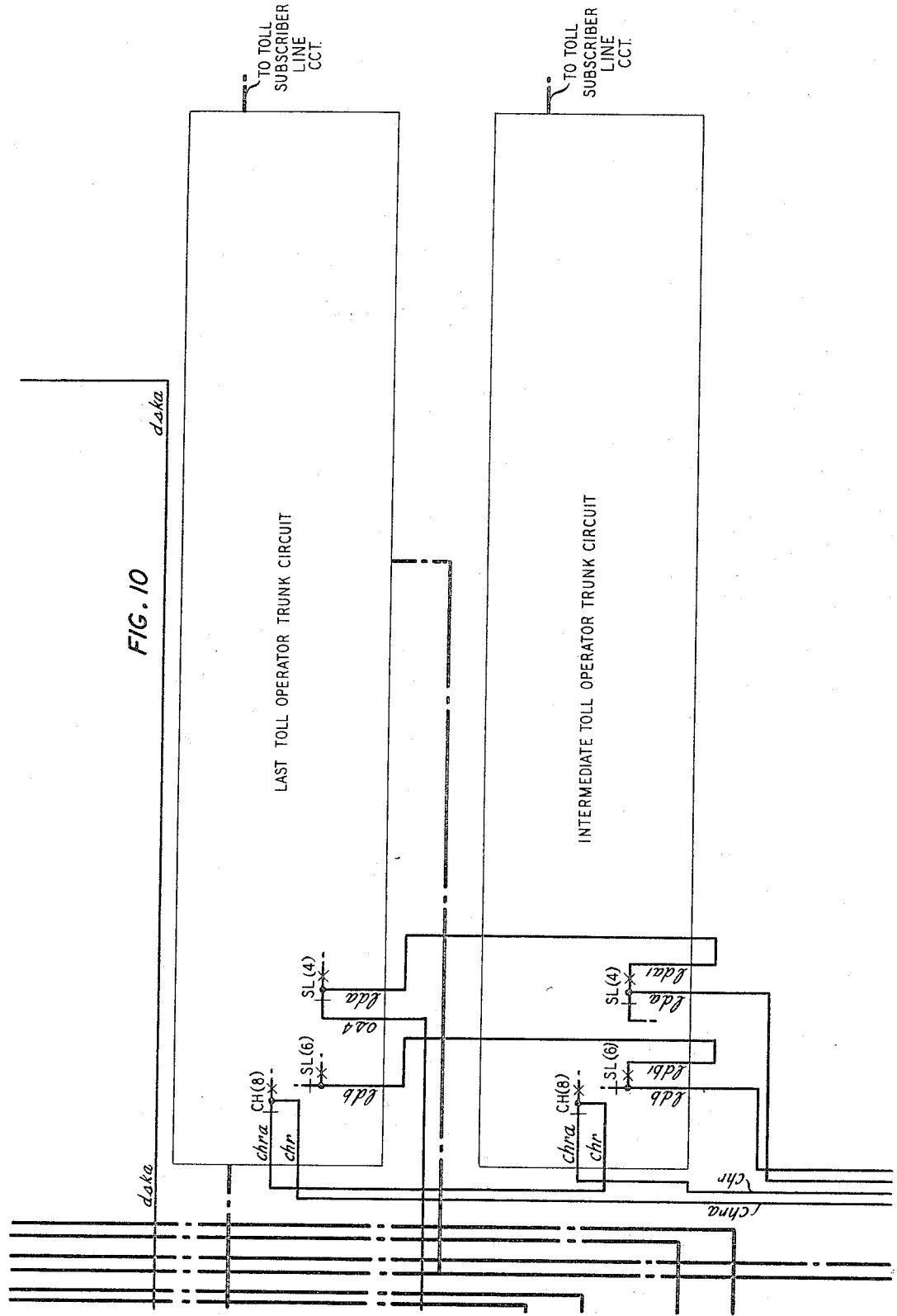
Figure 11:
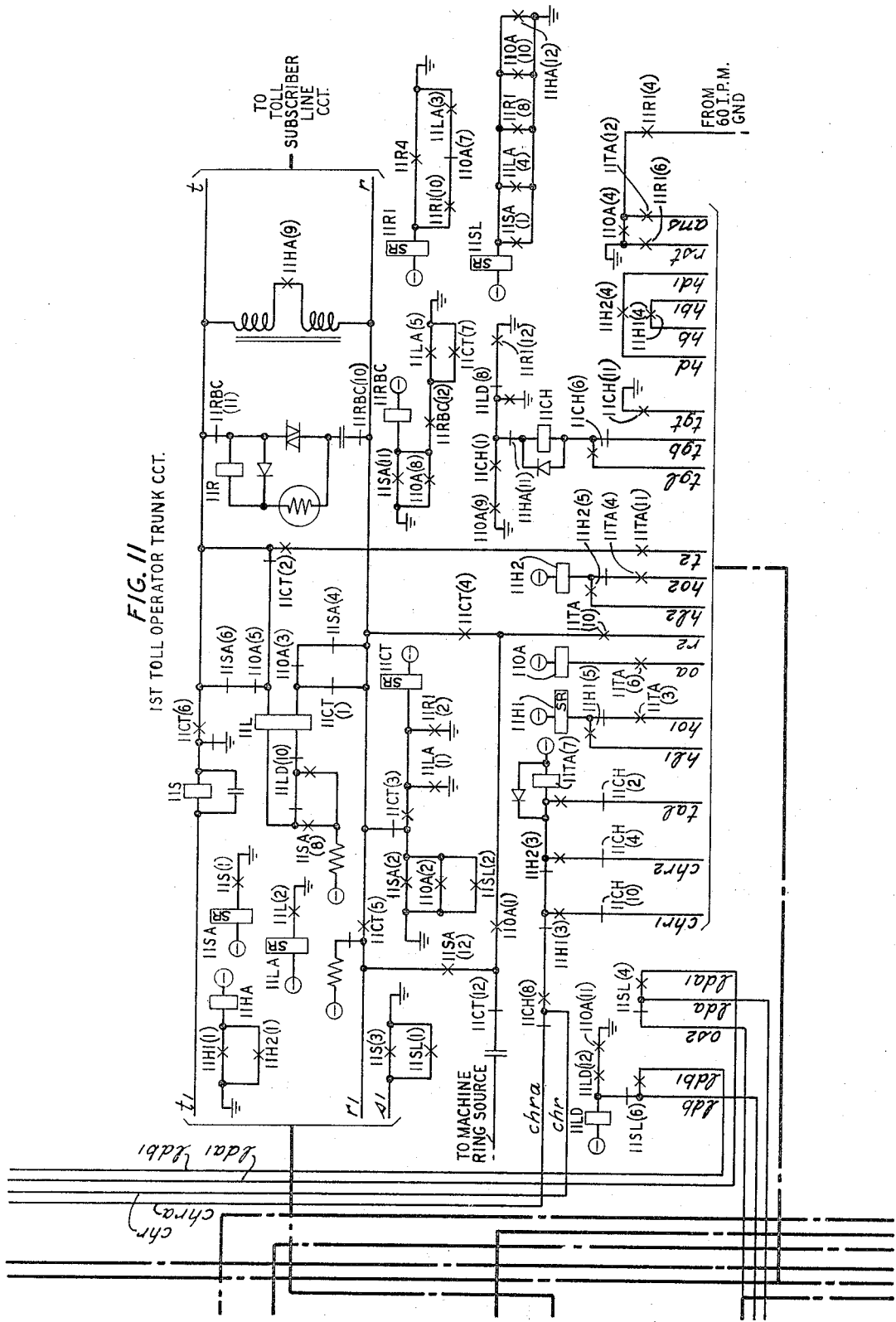
Figure 12:
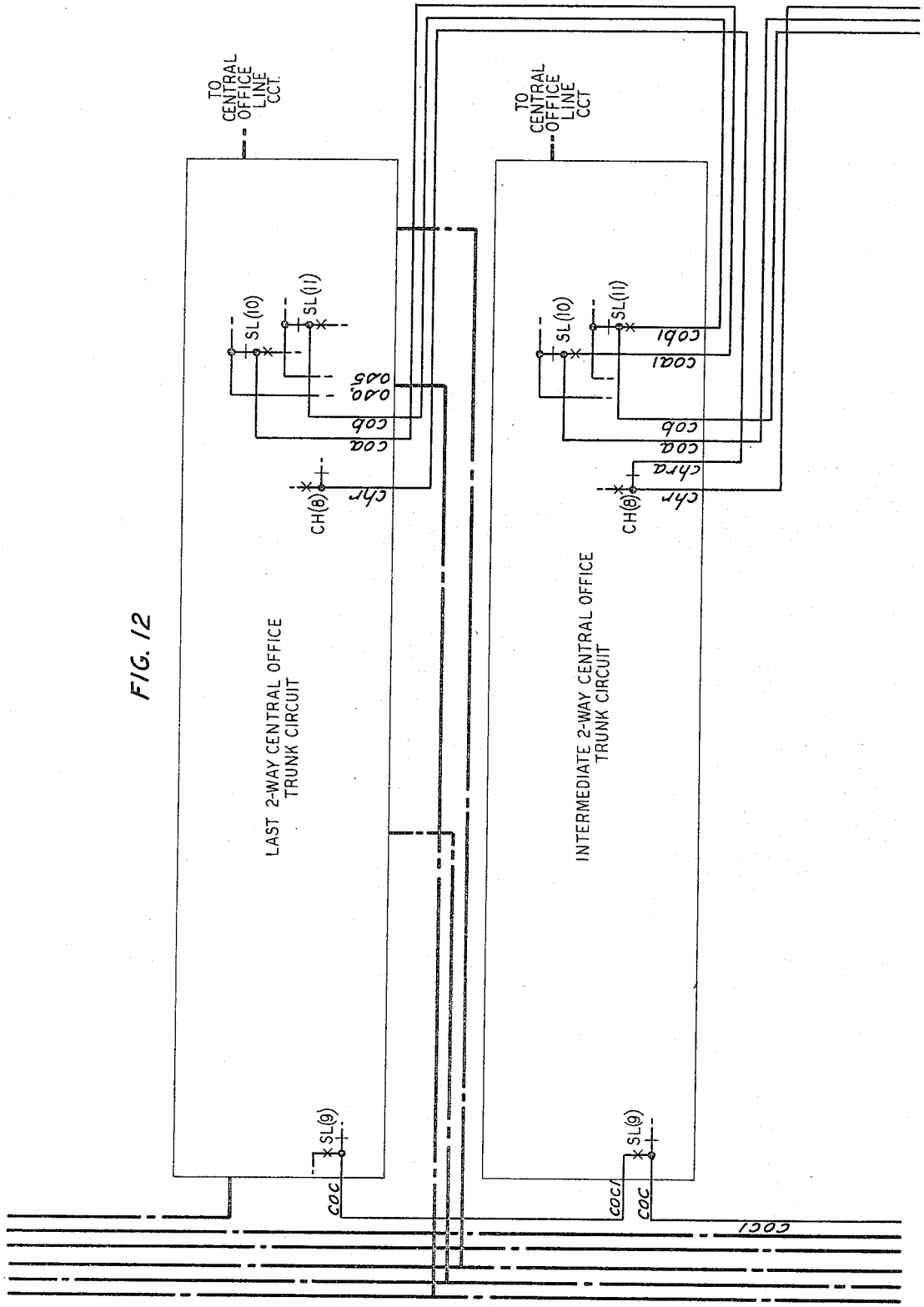
Figure 13:
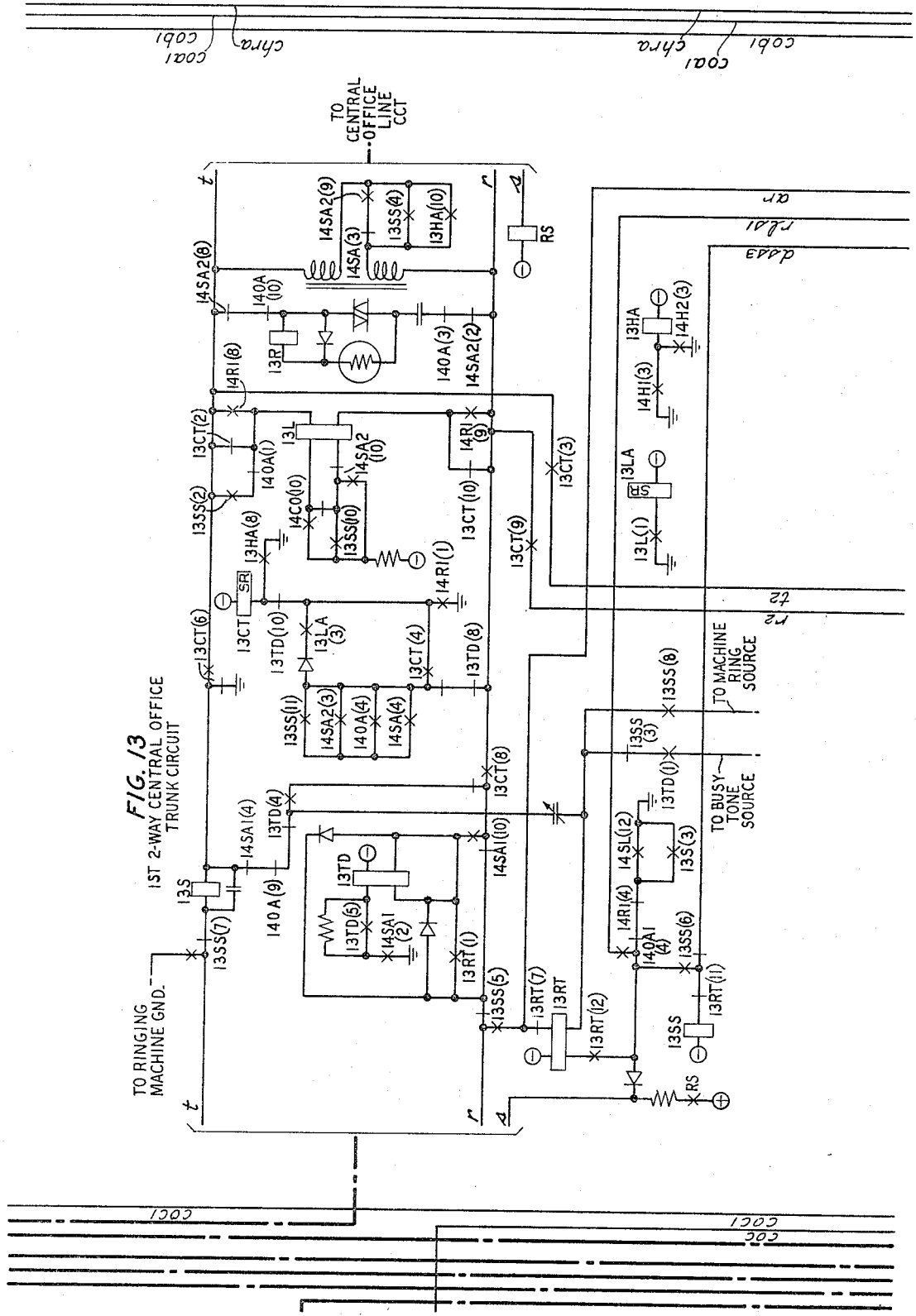
Figure 14:
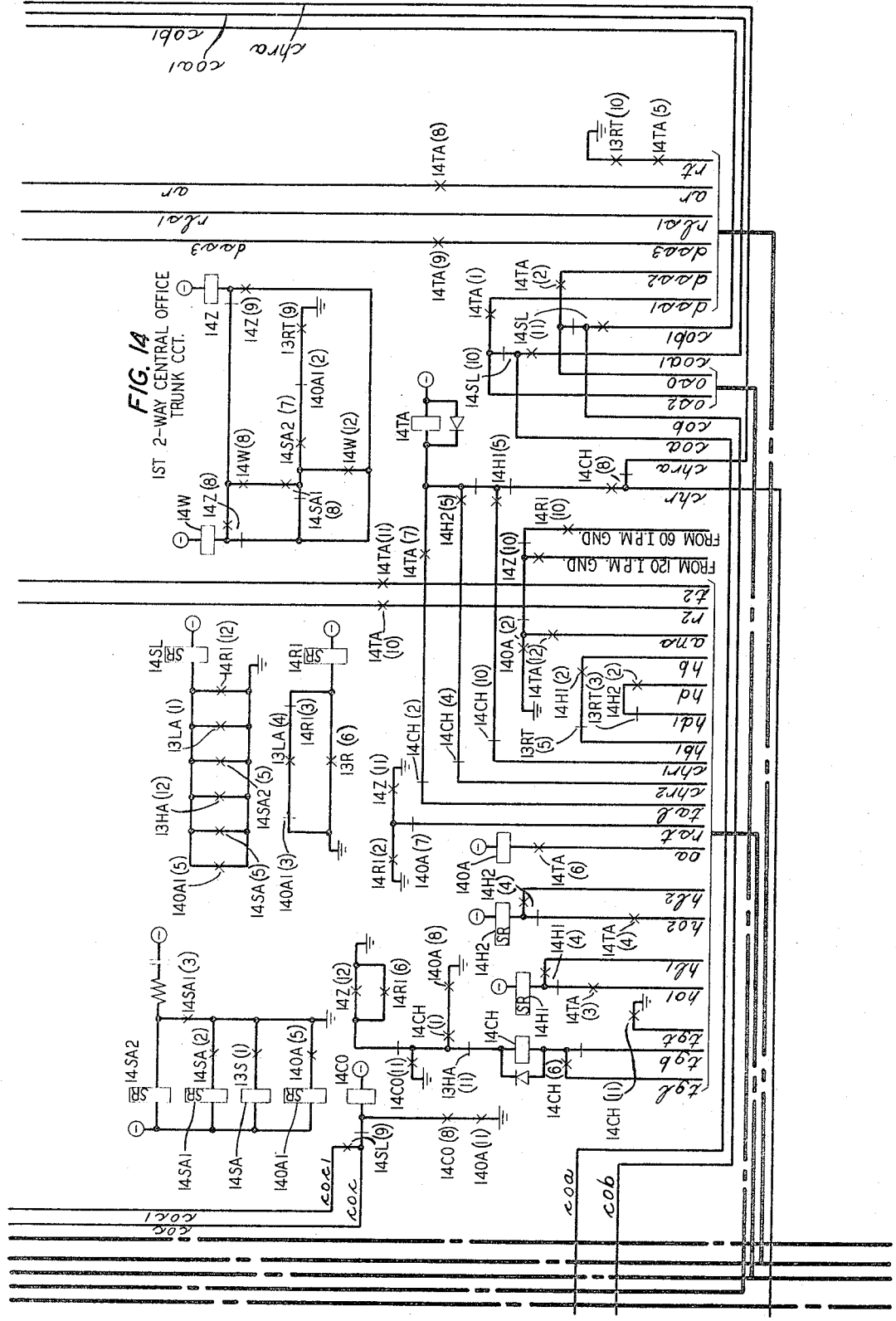
Figure 15:
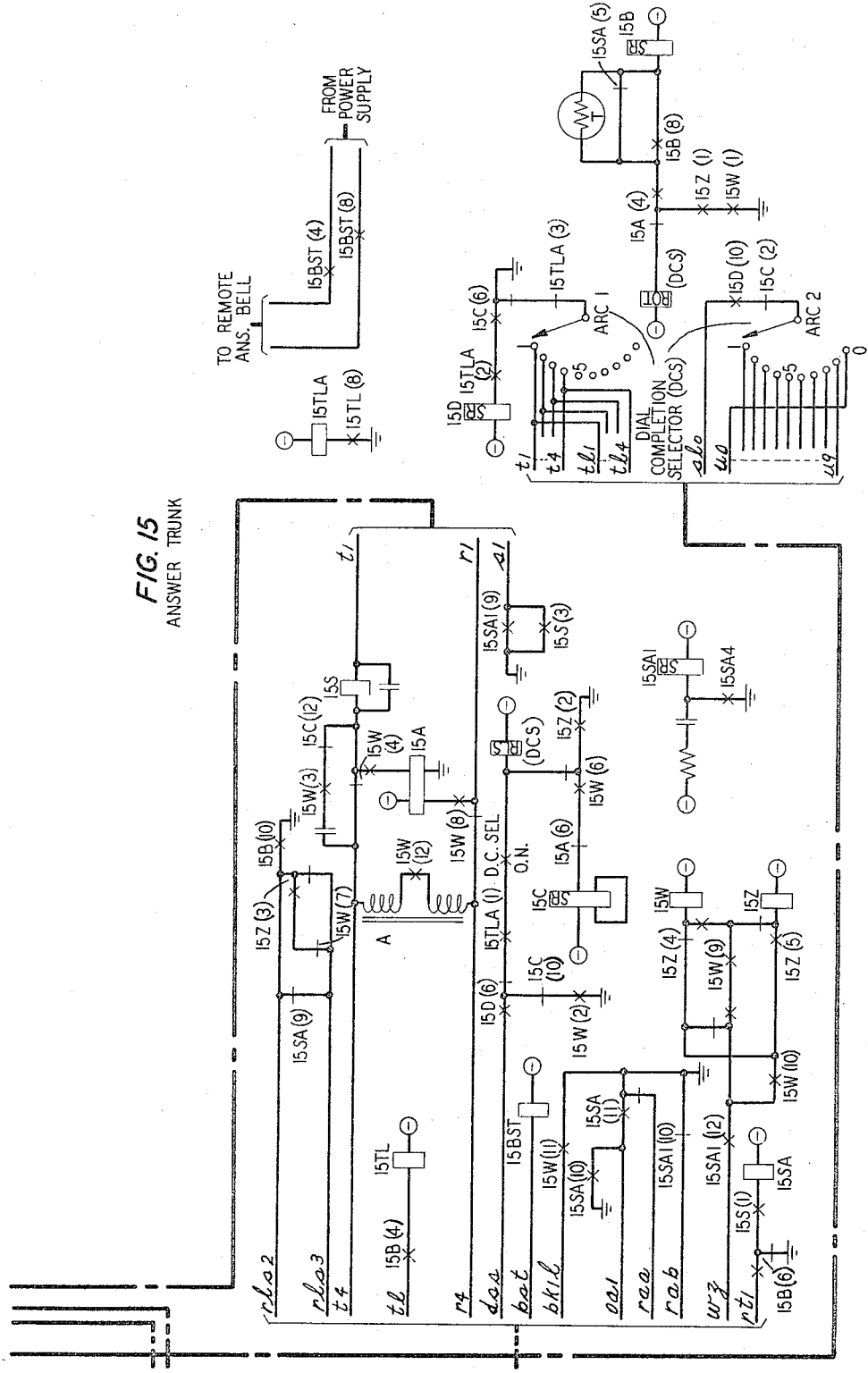

The foregoing and other objects and features may become more apparent by referring now to the drawing in which:

FIG. 1 shows the key-button telephone station set;
FIGS. 2 through 7 show the common control and attendant console circuits;
FIGS. 8 and 9 show the intercom trunk circuits;
FIGS. 10 and 11 show the toll operator trunk circuits;
FIGS. 12, 13, and 14 show the two-way central office trunk circuits;
FIG. 15 shows the answer trunk circuit; and
FIG. 16 shows how FIGS. 1 through 15 are to be oriented.

TABLE OF CONTENTS

| | Column |
|---|---|
| Incoming Call, General | 3 |
| Incoming Call, Detailed Description | 4 |
| Attendant Places Incoming Call on Hold | 7 |
| Extension Station Recalls Attendant | 8 |
| Remote Answer Operation, General | 9 |
| Remote Answer Operation, Details | 9 |
| Station Originates Local Call | 12 |
| Station Originates Call to Attendant | 13 |
| Attendant Originates Intercom Call | 15 |
| Station Originates Toll Call | 16 |
| Attendant Makes Toll Call | 17 |

*Incoming call, general*

Figure 5:
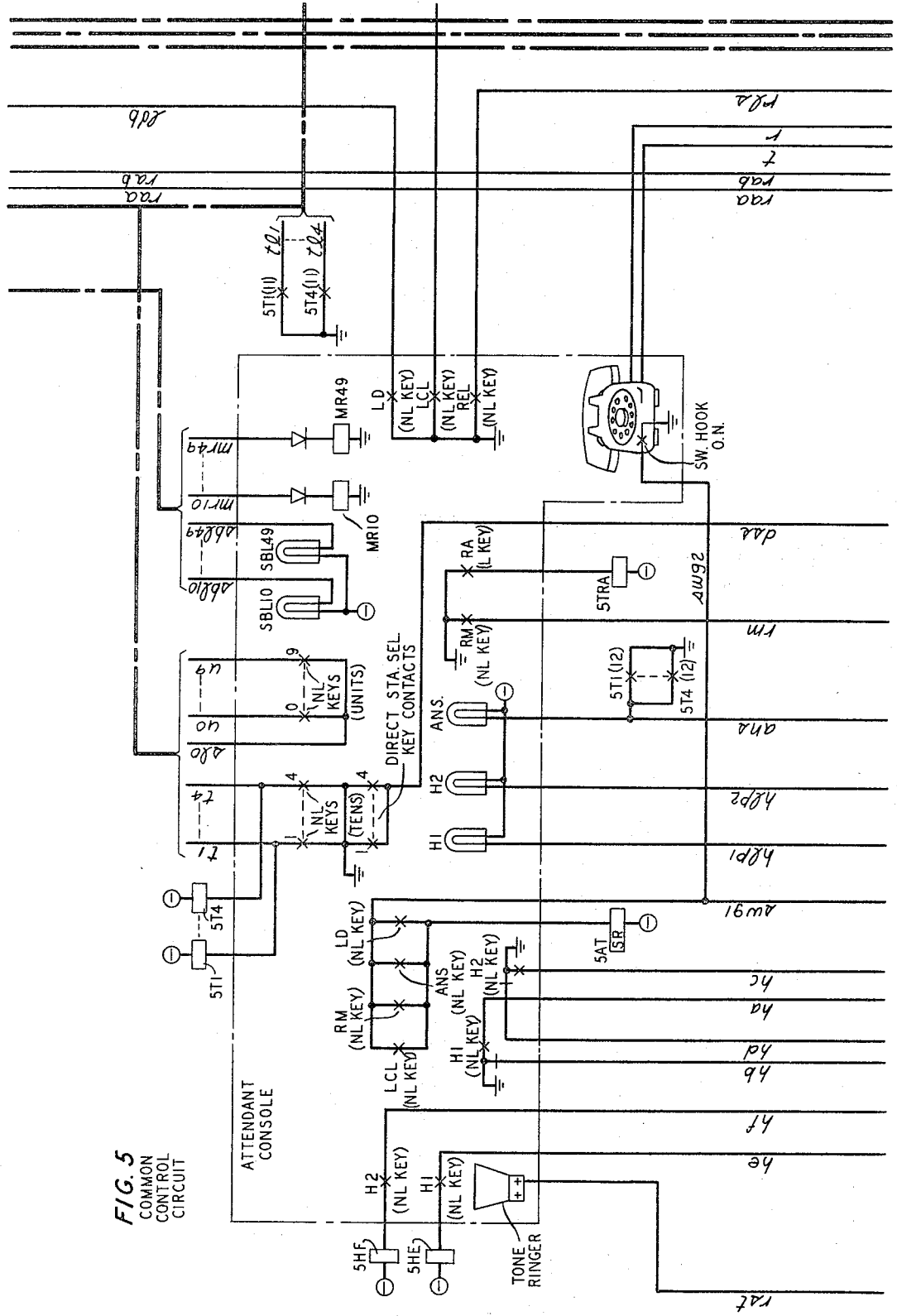
Figure 6:
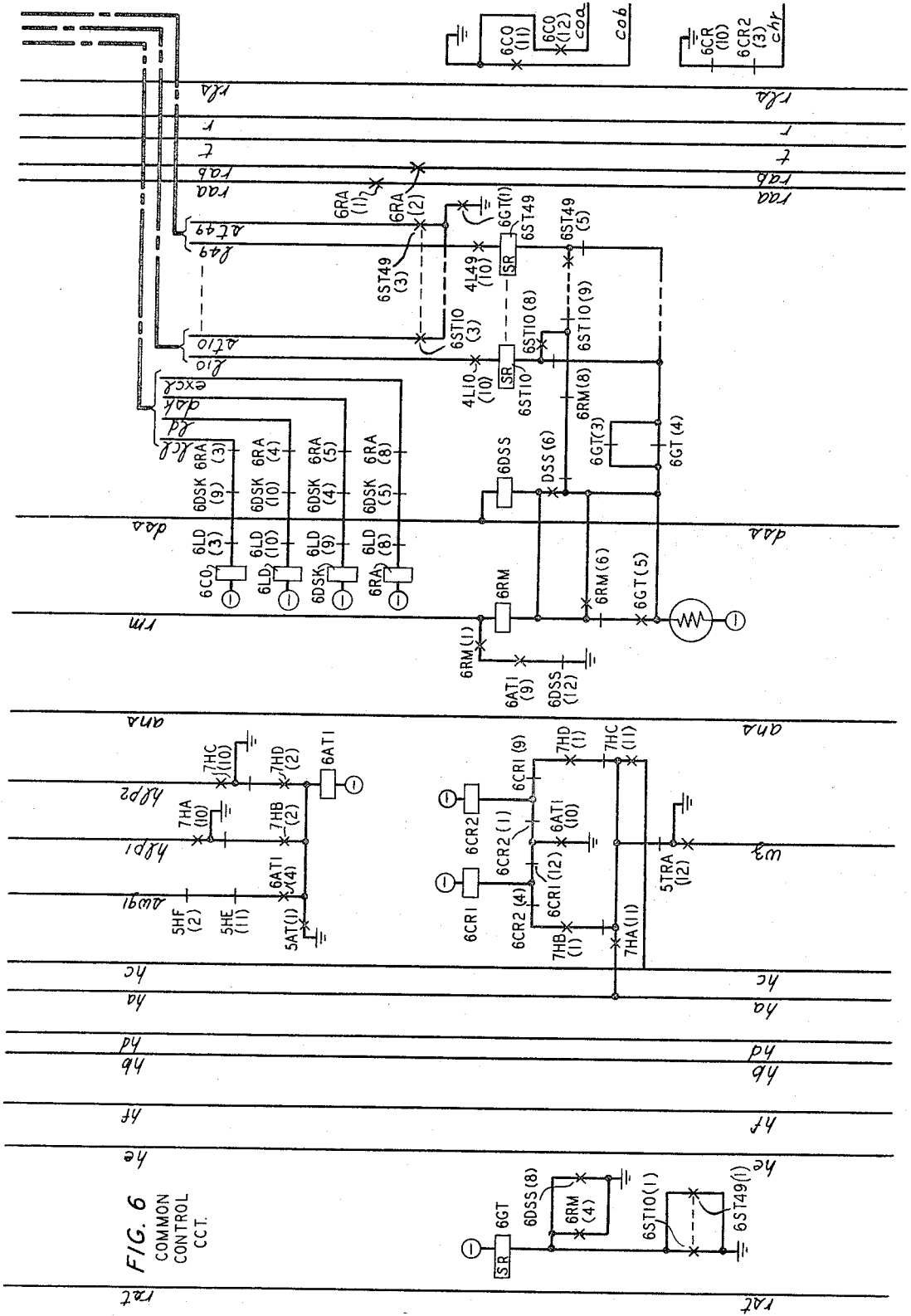
Figure 7:
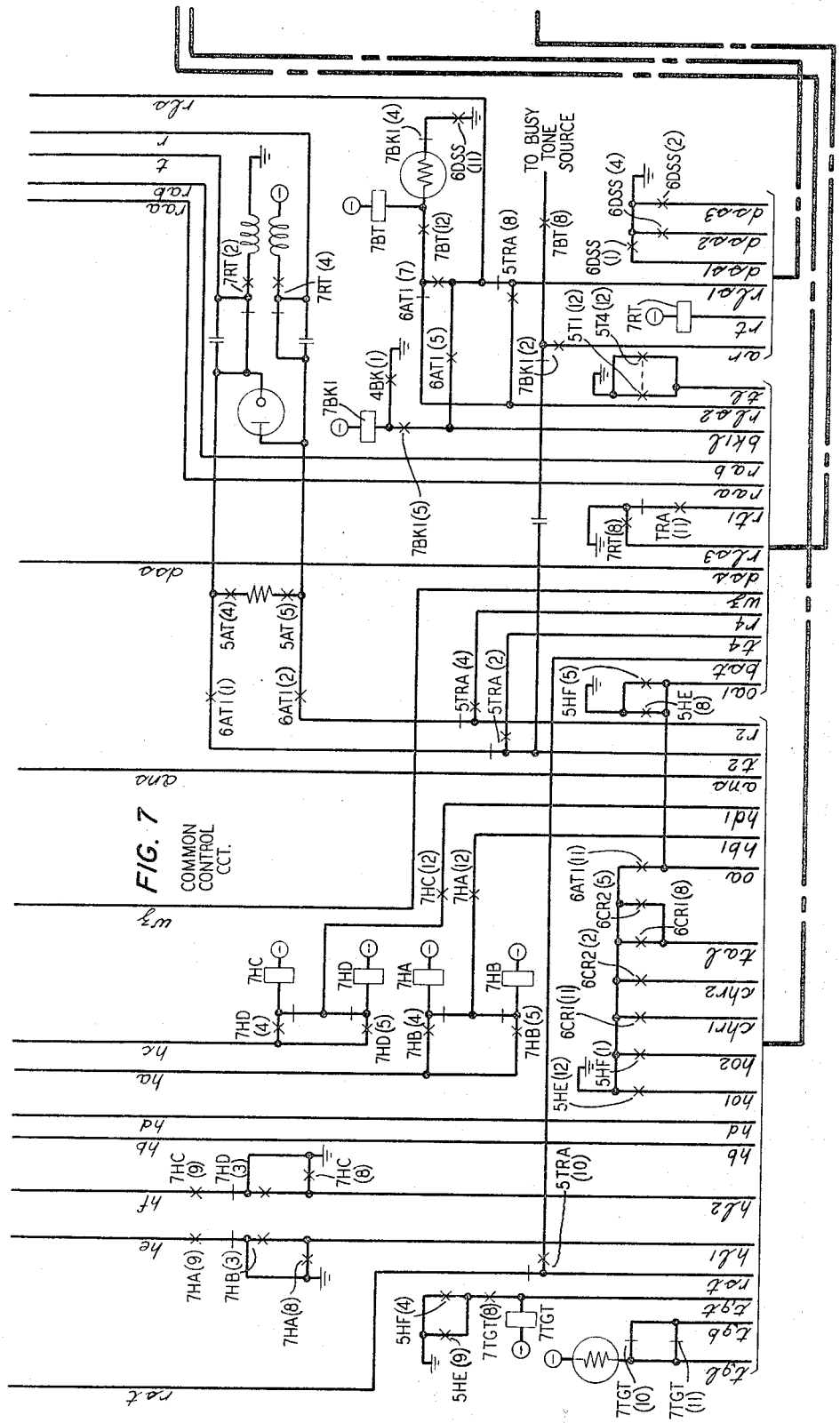

On an incoming call from the central office, one of the two-way central office trunks (FIGS. 12, 13, and 14) grounds lead *rst* operating the attendant console tone ringer (FIG. 5). If the attendant console is busy, the tone continues to sound and ringing tone is returned to the calling party. If the console is idle, the trunk seizes it and causes the answer lamp to flash at 60 i.p.m. The attendant can answer by taking the receiver off-hook and operating the nonlocking answer key. The answer lamp now lights steady, the ringing stops, and the attendant is connected to the central office. After obtaining the number of the called station, the attendant operates the direct station selection key for that station, causing the crossbar switch to close its proper crosspoints and to start ringing the station. The attendant and the calling party now receive ringing tone. The attendant may now leave the connection, by hanging up or may remain until the call is connected. When the called station answers, the ringing stops and the direct station selection lamp at the console lights steady. If the attendant has remained on the connection, the console is capacitor-coupled and local battery is supplied to reduce the transmission loss during a three-way conversation. When the attendant hangs up, the console is disconnected from the trunk leaving the central office and the called station connected.

*Incoming call, detailed description*

If the trunk (FIGS. 13 and 14) is seized by the incoming central office call during the silent interval, trunk relay 13L operates first from the trip battery (not shown) over the path to the central office including back contacts 13CT(2) and 13CT(10). If the trunk is seized during the ringing cycle, trunk relay 13R will operate first from the ringing current over the path to the central office including back contacts 140A(3), 140A(10), 14SA2(2), and 14SA2(8). In either case, both relays 13R and 13L operate on an incoming call. Relay 13L, at its make contact 13L(2), operates relay 13LA which operates relay 14SL and, at its make contact 13LA(3), prepares a path to operate relay 13CT. Relay 14R1 is operated over make contact 13R(6) and in turn operates relays 14SL, 14CH, and 13CT, and closes a path to ground the *rst* lead to the common control circuit (FIGS. 5 through 7) to sound the tone in the attendant console. Relay 14CH receives battery on lead *tgb* from the common control circuit (FIG. 7) over back contact 7TGT(10) which will be found normal provided no other trunk has seized the common control. Whenever any trunk seizes common control, a make contact of its "CH" relay, similar to make contact 14CH(11) of the first central office trunk, grounds lead *tgt* and operates common control relay 7TGT which closes the trunk gate, temporarily preventing other trunks from seizing the common control circuit. The diode in series with relay 13CT prevents the ring from tripping prematurely if relay 13CT is a little slow in operating. Relay 13CT operated, at its make contacts 13CT(6) and 13CT(8), connects the tip and ring of the trunk to the crossbar switch (FIG. 3) and, at its make contacts 13CT(3) and 13CT(9), prepares a path to connect the tip and ring to the common control circuit when relay 14TA operates.

Relay 14CH operated, at its make contact of its transfer contacts 14CH(8), operates relay 14TA. Relay 14TA, at its contacts 14TA(10) and 14TA(11), connects the trunk to the attendant console and, at its contact 14TA(12), applies 60 i.p.m. ground to the attendant console lead *ans* to flash the answer lamp which is advantageously positioned adjacent the nonlocking ANS key (FIG. 5). This indicates that a central office trunk has seized the console. If the attendant is busy when the trunk is seized by the central office, the 13L, 13LA, 13R, 14R1, and 13CT relays will operate and the tone at the console will sound but the 14CH relay will not operate because common control relay 7TGT, as explained above, will be operated and thereby close the trunk gate. When the attendant console becomes idle, the 14CH and 14TA relays will operate and connect the trunk to the console.

The attendant answers by removing the receiver from the switchhook and depressing the nonlocking ANS key at the attendant console, operating common control relay 5AT. Make contacts 5AT(4) and 5AT(5), shown in FIG. 7, bridge the tip and ring to the central office trunk and trip the ringing. Make contact 5AT(1) operates relay 6AT1 over whose make contacts 6AT1(1) and 6AT1(2) the attendant telephone set is bridged to the trunk. At the same time, make contact 6AT(11) grounds the *oa* lead to operate trunk relay 140A. Trunk relay 140A operated, at its back contacts 140A(3) and 140A(10), removes the ringing bridge from the tip and ring; at its make contact 140A(4), provides a locking path for relay 13CT; at its make contact 140A(5), operates relay 140A1; at its transfer contacts 140A(2), disconnects the 60 i.p.m. flashing ground from the answer lamp and substitutes steady ground; at its make contact 140A(8), locks relay 14CH operated; and, at its back contact 140A(7), opens the *rst* lead to stop the tone. Relay 140A1 operated, at the make contact of its transfer contacts 140A1(4), prepares a path for sleeve ground to the crossbar switch under control of the attendant console release key REL (FIG. 5); and, at its back contact 140A1(3), opens the locking path of relay 14R1, causing it to release. Relay 14R1 released, causes relay 13L to release. Relay 13L releases relay 13LA. The attendant is now able to talk to the calling party.

When the attendant releases the ANS key, relay 5AT releases which opens the DC tripping bridge across the tip and ring. An AC tripping bridge is provided by the gas tube which remains across the line in the common control circuit to insure that the ring will be tripped during the ringing cycle if the DC bridge fails to trip the ringing.

To connect a call to a station, the attendant operates a nonlocking direct station selection key, associated with the desired station, which operates the 6DSS relay and the proper select magnets in the crossbar switch. The direct station selection keys are advantageously arranged in a four by ten key button switch array so that depressing a particular key selects one of ten "units" leads designated *u*0–9 and one of four "tens" leads designated *t*1–4. The depressed key operates common control relay 6DSS. Relay 6DSS operated, at its make contact 6DSS(2), grounds lead *dss*3 which operates trunk relay 13SS. Relay 13SS operated, at its transfer contacts 13SS(5) and 13SS(7), connects ringing current on the tip and ring toward the station and opens the tip and ring back to the calling party and the attendant; at its make contact 13SS(4), connects an inductor across the tip and ring toward the central office as a holding bridge; at its make contacts 13SS(8), connects ringing tone to the calling party and the attendant; at its make contact 13SS(10), prepares a path to reoperate relay 13L if the attendant disconnects before the called party answers; and, at its make contact 13SS(11), provides an auxiliary locking path for the 13CT relay. If the attendant disconnects before the called party answers, relay 13L operates over its primary winding from resistance battery to ground on the tip lead. Relay 13L operates relay 13LA which holds relay 14SL operated until the called party answers or the calling party hangs up.

When the direct station selection key is operated, relay 6DSS in the common control circuit (FIG. 6) is operated as described above. In addition, the operated directed station selection key operates the associated one of the 5T1–4 relays which connects the *u*0–9 leads to an associated SW1–4 crossbar switch. The operated direct station selection key also prepares a path to operate the called station's crossbar switch hold magnet over the selected *u*0–9 lead.

Relay 6DSS operated, at its make contacts 6DSS(4), grounds lead *dss*2 which ground is steered over operated make contact 14TA(2) in the calling central office trunk to operate the associated 30S0 common control relay; at its make contact 6DSS(1), grounds lead *dss*1 which ground is steered over operated make contact 14TA(1) of the calling trunk to operate its respective one of the 30S2–20S9 relays in the common control circuit; at its make contact 6DSS(8), operates relay 7GT which closes the station gate by opening the operating paths of the 6RM and of the 6ST10–49 relays; at its make contact 6DSS(2), grounds lead *dss*3 to operate the trunk relay 13SS, as described above, which in turn applies ringing to the called station line when the crossbar switch operates.

Relay 30S0 operated, at a respective one of its make contacts, operates select magnet 3SM0 on each one of the four crossbar switches SW1–4. Similarly, the operated one of the 30S2–20S9 relays operates the corresponding one of select magnets 3SM2–2SM9 on each of the four crossbar switches.

If the called station is busy, ground from the operated hold magnet sleeve will prevent the operation of common control relay 4BK. Make contact 6DSS(11), shown in FIG. 7, applies ground in series with a thermistor to the winding of relay 7BT. After an interval of approximately one second the thermistor will permit relay 7BT to operate and it will lock over its make contact 7BT(12) under control of the 6AT1 relay. Relay 7BT operated, at its make contact 7BT(8), applies busy tone to the tip lead of the attendant console circuit. When the attendant releases the direct station selection key, the 6DSS, 5T–, 30S–, and 6GT relays and the 3SM– select magnets release. The 6GT relay released, at its back contact 6GT(5), opens the station gate, permitting the 6RM, 6DSS, or 6ST– relays to be operated on subsequent calls. The attendant can stop the busy tone by operating the REL key which releases relay 7BT.

If the called station is idle, relay 4BK operates, operating relay 7BK1. Relay 7BK1 operated, at its back contact 7BK1(4), prevents the operation of relay 7BT by opening its operating path; at its make contact 7BK1(1), shown in FIG. 4, short circuits the high resistance secondary winding of relay 4BK which permits the called station hold magnet 4H– to operate in series with the lower resisitance primary winding of relay 4BK; at its make contact 7BK1(2), sends audible ring to the attendant indicating that the called station line is idle and ringing. The operation of the 4H– hold magnet closes the crossbar switch crosspoints and ringing is now applied to the called station by the trunk. The operated hold magnet locks operated to ground on the *s* lead from the trunk. This ground also shunts the hold magnet battery to the 4BK relay causing it to release.

When the attendant releases the direct station selection key, the 6DSS, 5T–, 7GT, and 30S– relays and the 3SM– select magnets release. The 7GT relay released, opens the station gate permitting the 6RM, 6DSS, and 6ST– relays to be operated on subsequent calls.

When the called station answers, the ringing is tripped, the audible ring is stopped, and the called station is connected to the attendant and the calling party.

When the called station answers, trunk relay 13RT operates from the called station short. Relay 13RT operated, at its back contact 13RT(7), removes the ringing current from the called line; at its back contact 13RT(11), opens the locking path of relay 13SS causing it to release; at its make contact 13RT(1), short circuits the 13TD relay; at its make contact 13RT(10), grounds the *rt* lead to the common control circuit 7RT relay which operates to capacitor-couple the attendant console and to supply local talking battery when there is three-way conversation; and, at its back contacts 13RT(3) and 13RT(5), shown in FIG. 14, opens *hb* and *hd* leads to the common control circuit to open the holding bridge if the call (as hereinafter described) had been put on hold.

Relay 13SS released connects the talking path to the called station and, at its released contact 13SS(4), removes the holding bridge from the central office end of the trunk. Relays 13CT and 14SL are made slow release to prevent their releasing before the station supervisory relays can take over their holding paths.

When the called station is cut through to the trunk, relay 13S operates from central office battery and ground in series with the station short. Relay 13S operates relay 14SA which operates relay 14SA1 and provides a locking path for relays 13CT and 14SL. Relay 14SA1 operated, operates relay 14SA2 and provides preliminary paths for operating relay 14W. If the called station fails to answer, the attendant can release the crossbar switch by operating the release REL key at the console which removes the ground from the sleeve and disconnects the called station line from the trunk. The attendant may now connect the call to another station by operating the proper direct station selection key.

The attendant can release the called station line from the connection by momentarily depressing the nonlocking REL key in the attendant console. The REL key operated, removes ground from the *rls* lead which releases relay 7BK1 stopping audible ring, releases the crossbar switch 4H- hold magnet which releases the connection between the station and the trunk, and releases the 13SS relay in the trunk which removes ringing from the line.

After connecting an incoming call to a called station line, the attendant can release from the connection before or after the called station answers by placing the receiver on the switchhook which releases relay 6AT1. Relay 6AT1 released, releases relay 7BK1 which opens the *ar* audible ring lead and also removes ground from the *oa* lead. The trunk in turn removes ground from the *ans* lead which extinguishes the ANS lamp at the attendant console. The release of trunk relay 140A removes ground from lead *rst* which causes the trunk to disconnect from the common control circuit, releasing common control relays 7TGT and 7RT (which are operated if the called station answers before the attendant releases from the connection). Relay 7TGT released opens the trunk gate, permitting subsequent calls to be connected to the attendant.

When the attendant hangs up the receiver, ground is removed from the *oa* lead, releasing trunk relays 140A and 14CH, as just mentioned. Relay 140A released, releases relay 140A1 which transfers, at its contact 140A1(4), the sleeve holding ground from the control of the attendant console REL key and lead *rls1* to the control of contact 14SL(12). Relay 14CH released causes trunk relay 14TA to release which disconnects the attendant console from the trunk and makes the attendant console circuit available to another call.

*Attendant places incoming call on hold*

After answering an incoming call, the attendant may momentarily depress one of the two nonlocking hold keys H1 or H2 in the attendant console (FIG. 5) to place the call on hold. Assuming that the H1 key is depressed, relay 7HA is first operated and in turn operates relay 5HE. Relay 7HA operated, at the make contact of its transfer contacts 7HA(10), lights the H1 lamp in the console to indicate that the call is on hold, and, at its make contact 7HA(8), grounds the *hl1* lead to provide a locking path for the 14H1 relay in the trunk.

Relay 5HE operated, for example, at its back contact 5HE(11), releases relay 6AT1 which opens the talking path to the attendant; at its make contact 5HE(9), locks relay 7TGT operated to keep the trunk gate closed while the hold condition is being established; at its make contact 5HE(8), grounds lead *oa* to keep the trunk connected to the common control while the hold condition is being established; and, at its make contact 5HE(12), ground leads *ho1* which operates the trunk relay 14H1 to place the call on hold.

Trunk relay 14H1 operated, at its make contact 14H1(3), operates trunk relay 13HA; at its back contacts 14H1(5), opens the operating path of trunk relay 14TA causing it to release; and, at its make contacts 14H1(2), completes a path between leads *hb* and *hb1* to the common control circuit which allows the hold condition to be automatically released when a call is completed to a station.

Trunk relay 13HA operated, at its back contact 13HA(11), opens the holding path to trunk relay 14CH causing it to release; and, at its make contact 13HA(10), places the holding bridge across the tip and ring to the central office to hold the call. When the 14CH and 14TA relays release, the attendant console is disconnected from the trunk and is available for use on another call. A second call can be held by operating hold key H2 which will operate its associated relays and function in similar manner to that explained above.

When the H1 key is released, the operated relay 5HE is released and the associated relay 7HB is operated. The release of relay 5HE releases relay 7TGT enabling subsequent calls to be connected to the attendant. The release of these relays removes ground from leads *oa* and *ho1*. The operation of relay 7HB prepares a path to operate the 6AT1 and the 6CR1 or 6CR2 relays when the hold key is reoperated to release the hold condition.

When the attendant desires to re-enter the held connection, she removes the receiver from the switchhook and momentarily reoperates the H1 key which releases relay 7HA. Relay 7HA released extinguishes the H1 lamp in the attendant console, operates relay 6AT1 if it is not operated at this time, and operates relay 6CR1 which locks over make contact 6AT1(10). Relay 6CR1 operated removes ground from the *chr* lead which prevents all other trunks from connecting to the common control circuit, places ground on the *chr1* lead which reoperates trunk relay 14TA causing the trunk to reconnect to the common control circuit, and grounds the *tal* lead which holds the trunk connection to the common control circuit by providing locking ground to trunk relay 14TA. The reoperation of relay 14TA causes the ANS lamp to light indicating that the trunk is reconnected to the attendant. When the H1 key is released, relay 7HB is released and removes ground from the *hl1* lead, releasing the 14H1 relay in the trunk. The release of trunk relay 14H1 releases trunk relay 13HA which in turn removes the holding bridge to the central office. The hold condition is now removed from the trunk.

Trunk relay 14TA operated allows trunk relay 140A to operate which causes the answer lamp to light steady and re-establishes attendant control of the circuit. The attendant is again connected to, and is in control of the trunk. When the called station answers a call which the attendant has placed on hold, relay 13RT in the trunk operates and, at its back contacts 13RT(5), opens the *hb1* lead holding path to the common control relay 7HA. Relay 7HA released, releases relay 7HB and extinguishes the H1 hold lamp indicating to the attendant that the called station has answered. Relay 7HB released removes locking ground from lead *hl1* releasing the 14H1 hold relay in the trunk.

*Extension station recalls attendant*

When the called station momentarily depresses the switchhook, trunk relays 13S, 14SA, and 14SA1 release in sequence causing relay 14W to operate. When the called station releases the switchhook, relays 13S, 14SA, and 14SA1 reoperate, and with relay 14W operated, relay 14Z operates. Relay 14Z operated, at its make contact 14Z(11), grounds lead *rst* to operate the tone source at the console (or to ring the remote answer bell hereinafter to be described). Relay 14Z operated, at its make contact 14Z(12), operates relay 14CH when the attendant loop is idle. Relay 14CH operated allows relay 14TA to operate. Relay 14TA operated, at its make contacts 14TA (10) and 14TA(11), connects the trunk to the attendant console; at its make contact 14TA(12), connects 120 i.p.m. ground made available over make contact 14Z(10) to flash the answer lamp; at its make contact 14TA(6), completes the path to operate trunk relay 140A when the attendant answers; at its make contacts 14TA(3) and 14TA(4), prepares a path for operating trunk relay 14H1 or 14H2; and, at its make contact 14TA(5), grounds lead *rt* to make relay 7RT in the common control circuit operate.

The attendant answers the recall in the same manner as the incoming call described above and relay 140A is operated. Relay 140A operated, operates relay 140A1, provides and auxiliary holding path for relay 13CT, changes answer lamp ground from 120 i.p.m. flash to steady ground, removes ground from lead *rst* to stop the tone (or the remote answer bell), and provides locking ground for relay 14CH. Relay 140A1 operated, at its back contact 140A1(2), removes locking ground from relay 14W causing it to release which in turn releases relay 14Z. Relay 140A1 operated also provides an auxiliary holding path for relay 14SL and, at its transfer contacts 140A1(4), transfers control of the sleeve lead holding ground from make contact 14SL(12) of the 14SL relay to lead *rls1* and the attendant console REL key. The attendant is now able to talk to both parties.

*Remote answer operation, general*

The attendant may place the PBX into remote answer operation by operating the RA key in the attendant console so that the attendant can answer an incoming call from any station in the PBX. Any incoming call thereafter connects to the answer trunk (FIG. 15) which rings a centrally located remote answer bell. The attendant may answer the call at any PBX station, such as station 10 (FIG. 1), by removing the receiver from the switchhook, pulling up the switchhook exclusion key in the telephone set cradle, and depressing the DSK key. This combination of steps provides against the inadvertent interception of the call by any other extension user who at that moment may have desired to reach the desk. The station operated by the attendant is connected to the answer trunk through the crossbar switch, the remote answer bell is silenced, and a connection is established between the station and the calling trunk. After sufficient information is obtained from the conversation, the attendant at this station may connect the call to other stations in the PBX by flashing the switchhook and dialing the two digit code of the desired station. This connects the trunk to the called station line. The trunk rings the called station and sends audible ring to the calling remote answer station. When the called station answers, ringing is tripped and the called station is connected to the calling trunk. The remote answer station can release from the connection by placing the receiver on the switchhook. The crossbar switch connection between the station and the answer trunk releases and the calling trunk disconnects from the answer trunk.

*Remote answer operation, details*

The foregoing sequence will now be described in detail. The RA key operated at the attendant console (FIG. 5) operates relay 5TRA. Relay 5TRA operated, at its transfer contacts 5TRA(2) and 5TRA(4), connects the answer trunk *t4* and *r4* leads to the *t2* and *r2* leads of the common control circuit; at its transfer contacts 5TRA(10), connects the *rst* lead to the *bst* lead to operate answer trunk relay 15BST which sounds the remote answer bell; at its transfer contacts 5TRA(8), places the *rls1* lead under control of the answer trunk permitting whichever remote answer station is selected to perform functions similar to the attendant release key by flashing the switchhook; and, at its make contact 5TRA(12), places ground on the *wz* lead permitting the answer trunk to respond to switchhook flashes.

The calling trunk connects to the common control and closes the trunk gate by operating relay 7TGT. The remote answer bell sounds. The call can be answered by the attendant from any station in the PBX by removing the receiver from the switchhook, operating the exclusion key, and depressing the DSK key on the station set. When the receiver of station 10, for example, is taken off the switchhook, relay 4L0 operates and grounds lead *sbl0* which lights station busy lamp SBL10. The operation of relay 4L0, at its make contact 4(L0(10), prepares a path for operating relay 6ST10. When the DSK key is operated at station 10, lead *l10* is grounded and relay 6ST10 operates and in turn operates relay 7GT. Relay 7GT operated, at its back contacts 7GT(3) and 7GT(4), closes the station gate to other stations by opening the operating path of all other 6ST– relays and, at its make contact 7GT(1), completes an operating path for relay 6RA. Relay 6RA operates to ground on lead *excl*, and at its make contacts 6RA(2) and 6RA(1), operates the 30S1 and 30S5 relays, respectively, which in turn operate select magnets 3SM1 and 3SM5 in each of the four crossbar switches. The select magnets and relay 6ST10 operated, operate hold magnet 4H0 which is associated with the remote answer station. Hold magnet 4H0 operated releases relay 4L0 and the station bridge connected by the operated crosspoints trips the ring on calls from central office or toll operator trunks. The answer trunk 15S relay is operated under control of the station bridge between the tip and ring and, at its make contact 15S(3), places a holding ground on the *s1* lead of the answer trunk's appearance in the crossbar switch, locking the hold magnet 4H0 operated. Relay 15S operated, at its make contact 15S(1), operates relay 15SA. Relay 15SA operated, at its make contact 15SA(4), operates relay 15SA1 and, at its make contact 15SA(10), sends an answer signal to the calling trunk by grounding lead *oa1*. The trunk in turn removes ground from lead *bst*, releasing relay 15BST. This relay released silences the remote answer bell. Relay 15SA1 operated, at its transfer contact 15SA1(11) and at its back contact 15SA1(10), removes ground from lears *raa* and *rab*, respectively, to prevent other stations from connecting to the answer trunk and, at its make contact 15SA1(9), places an additional holding ground on the *s1* lead. This prevents a false release of the remote answer station when the attendant subsequently flashes the switchhook in order to dial complete the calling trunk to another PBX station. At its transfer contact 15SA1(11), relay 15SA1 places an additional holding ground on the *oa1* lead to keep the calling trunk connected to the remote answer circuit when the attendant flashes the switchhook.

The remote answer station may connect incoming calls to any station in the PBX by flashing the switchhook and dialing a two digit code associated with the called station number. With the switchhook depressed, answer trunk relay 15S releases, releasing relay 15SA. Relay 15SA released opens the operate path of relay 15SA1. (Relay 15SA1 does not release at this time because of its slow release feature and the RC timing circuit.) Relay 15SA released, at its transfer contact 15SA(6), operates relay 15W. Relay 15W operated, at its make contact 15W(12), places a holding bridge on the calling trunk; at its transfer contacts 15W(4) and 15W(8), splits the remote answer station from the calling trunk and prepares a dialing path by connecting the *t1* and *r1* leads to the windings of relay 15A; and, at its make contact 15W(3), closes through an audible ring path under control of make contact 15C(12) of relay 15C.

When the attendant releases the switchhook, relays 15A, 15S, and 15SA operate. Relay 15SA operated, operates relay 15Z. Relay 15Z operated locks up under control of relays 15W and 15SA1 and opens its original operate path. Transfer contacts 15Z(4) change the lockup path of relay 15W and place relay 15W under control of operated transfer contacts 15SA(6) and 15SA1(12). Operated make contact 15Z(1) completes the closure of the operate path of relay 15B through the operated transfer contact 15A(4). Relay 15B operated, at its transfer contacts 15B(6), places relay 15SA under control of the common control circuit lead *rt1*, and at its make contact 15B(4), prepares the operate path of relay 15TL.

The attendant now dials the desired tens digit and relay 15A follows the dial pulses. The first release of relay 15A closes through the operate path of relay 15C. Relays 15B and 15C do not thereafter release during dial pulses because of their slow release features. Relay 15C operated removes ground from the wiper of the dial completion selector arc 1.

When the desired tens digit has been dialed and the dial has restored to normal, relay 15A reoperates. Relay 15A reoperated opens the operate path of relay 15C and opens the dial completion selector (DCS) ROT magnet operate path. Relay 15C released places ground on the wiper of selector arc 1. Ground from selector arc 1 is now closed through the $t-$ lead selected by the rotary selector responsive to dialing and operates its associated 5T– relay in the common control circuit. (Common control relay 5T– operated prepares a path in FIG. 4 to operate the called station hold magnet over one of the $u0-9$ leads hereinafter to be selected by the next dialed digit.) The operated one of the common control 5T1–4 relays closes through ground on lead $tl$ to operate relay 15TL in the answer trunk. Relay 15TL operated closes through the operate path of relay 15TLA and connects leads $tl1-4$ and leads $tl-4$ to lock the corresponding one of relays 5T1–4 operated in the common control circuit. Relay 15TLA operated removes ground from selector arc 1, closes through the operate path of the dial completion selector RLS magnet to restore the selector to normal, and prepares the operate path of relay 15D.

The attendant now dials the desired units digit and relay 15A follows the dial pulses. With the first release of relay 15A, relay 15C operates. The operation of relay 15C closes through the operate path of relay 15D. Relay 15D operated prepares a path to connect lead $slo$ of the common control circuit to selector arc 2. The same sequence of operations takes place as previously described for the tens digit. When the desired units digit is reached and the dial restores to normal, relay 15A operates. The operation of relay 15A opens the operate path of relay 15C. Relay 15C released places ground on the $dss$ lead of the common control circuit which operates common control relay 6DSS. Relay 6DSS operated, operates the one of the 30S2–20S9 relays associated with the calling trunk and this in turn controls the select magnets which place ground on the proper $u-$ lead to operate the crossbar switch hold magnet associated with the dialed station. Audible ring is heard at the remote answer station. Relay 15C released also opens the operate path of relay 15D. Relay 15D released closes through the operate path of the RLS magnet which restores the selector to normal. The 15D relay is slow release in order to insure the operation of the crosspoints in the crossbar switch.

When the called station answers, the ringing is tripped, the audible ring to the remote answer station is stopped and the trunk relay of the calling trunk such as trunk relay 13RT operates, operating common control relay 7RT. Common control relay 7RT operated, at its transfer contacts 7RT(8), removes ground from the $rt1$ lead which releases answer trunk relay 15SA causing it to close through the talking path to the remote answer station. Transfer contacts 7RT(8) also place a locking ground on lead $rls3$ to the answer trunk. This ground is continued to the calling trunk and back to the called station hold magnet over the $rls1$ lead so long as the remote answer station is on the connection. Relay 15SA released opens the operate path of relay 15SA1 and the holding path of relay 15W. Relay 15SA1 does not release because of its slow release feature. The release of relay 15W opens the operate path of relays 15A and 15B, removes the holding bridge, closes the talking path between the calling trunk and the remote answer station and removes ground from the $bk1l$ lead which signals the common control to stop the audible ring. The release of relay 15B operates relay 15SA which operated opens the holding path of relay 15Z. A three-way connection is thus established between the calling trunk, the remote answer station, and the called station.

The remote answer station releases from the connection by placing the receiver on the switchhook. This releases the crossbar switch connection between the remote station and the answer trunk and releases relay 7BK1. The calling trunk disconnects from the common control, releasing relay 7RT.

If the attendant dials a busy station, the switchhook is flashed to connect back to the incoming call. On the flash of the switchhook, the following sequence of operations takes place.

When the attendant depresses the switchhook, relays 15S and 15A release. The release of relay 15A opens the operate path of relay 15B. The release of relay 15S opens the operate path of relay 15SA. The release of relay 15SA opens the operate paths of relays 15W and 15SA1. (Relay 15SA1 does not release because of its slow release feature.) Relay 15W releasing removes the holding bridge and closes the talking path between the calling trunk and the remote answer station. The release of relay 15B removes ground from the $rls2$ lead which signals the common control to stop the busy tone. When the attendant releases the switchhook, relay 15S operates. Relay 15S operating closes through the operate path of relay 15SA. The operation of relay 15SA opens the holding path of relay 15Z. Relay 15Z released opens the $rls2$ lead which releases the crossbar switch crosspoints associated with the called station. The circuit is now returned to its original seizure state.

The attendant can release the called station by momentarily depressing the switchhook. Relays 15S and 15SA release and relay 15W operates. Relay 15W operated places a holding bridge on the calling trunk, splits the remote answer station from the calling trunk, and prepares a dialing path by connecting the $t1$ and $r1$ leads to the windings of relay 15A.

When the attendant releases the switchhook, relays 15A, 15S, and 15SA operate. Relay 15SA operated, operates relay 15Z. Relay 15Z operated opens the ground path between the $rls2$ and the $rls3$ leads, releasing the crossbar switch connection to the called station. Relay 15Z operated also operates relay 15B which grounds the $rls2$ lead. The 15B relay is made slow operate to allow the crossbar switch to release the called station before a ground is placed on the $rls2$ lead.

The attendant can now dial another PBX station. The attendant releases the called station line by momentarily depressing the switchhook. Relays 15A, 15B, 15S, 15SA, and 15W release. Relay 15B released removes ground from the $rls2$ lead, releasing the crossbar switch connection to the called station line. Relay 15W released removes ground from the $bk1l$ lead which signals the common control to stop the audible ring, removes the holding bridge and reconnects the talking path between the calling trunk and the remote answer station. When the switchhook is released, relays 15S and 15SA operate and relay 15Z releases, and the circuit is in its original seizure state.

*Station originates local call*

When a station operates the local key, the direct station selection lamp at the console lights steady, the first idle central office trunk is seized, dial tone is heard and the station can dial the desired number.

When the receiver is removed from the switchhook at a PBX station, the associated 4L– relay operates in the common control circuit. Relay 4L– operated lights the station busy lamp at the attendant console and prepares a path for operating one of the 6ST10–49 relays. The station user then depresses the nonlocking LCL key at the station set which operates the associated 6ST10–49 relay which operated, operates relay 7GT. Relay 7GT operated closes the station gate to the attendant and all other stations, by opening the operating path of the 6RM, 6DSS, and all other 6ST– relays and operates relay 6C0. Relay 6C0 operated grounds the $cob$ lead which is extended over back contact 14SL(11) to lead $oso$ and operates relay 30S0 if the first central office trunk is idle. Relay 6C0 operated also grounds the *coa* lead which operates the other one of the 30S– relays (for example, relay 30S2 or 30S5) associated with the first idle central office trunk in the chain of central office trunk 14SL relays. (FIGS. 12 and 13). Relay 30S0 operated, for example, operates select magnet 3SM0 on each of the four crossbar switches, and similarly relay 30S2 operated, operates select magnet 3SM2 on each of the four crossbar switches. The select magnet and the 6ST– relay operated, operate the 4H– hold magnet associated with the calling station. The 4H– hold magnet operated releases the 4L– relay and closes crossbar switch crosspoints between the calling station and the first idle central office trunk. Relay 4L– released, releases the 6ST– relay which is made slow release to insure that the trunk will have sufficient time to lock the hold magnet operated if the LCL key is released prematurely by the calling station. Relay 6ST– released, releases the slow release 7GT relay which opens the station gate and releases relay 6C0, releasing the 30S– relays which release the 3SM– select magnets.

The station short causes relay 13S to operate from local battery and ground. Relay 13S grounds the sleeve to hold the crossbar switch, and operates relay 14SA which grounds the *r* lead to the central office and operates relay 14SA1. Relays 14SA2 and 14SL are operated and at the same time the central office equipment returns ground on the *t* lead which operates relay 13L. Relay 13L operates relay 13LA which completes a path to operate relay 13CT. Relay 13CT operated connects the station and central office ends of the trunk together, causes relay 13L to release, provides its own locking path, and removes the start ground from the *r* lead. Relay 13L released causes relay 13LA to release. The calling station now hears dial tone and can dial the desired number.

If a PBX station making an outgoing call dials a toll code, battery and ground are reversed from the central office. This reversal causes relay 13TD to operate from ground on the ring through operated contacts of relay 14SA1, the primary winding of relay 13TD, and the diode to battery on the tip. Relay 13TD operated releases relay 13CT, opens the path of the start ground to prevent reseizure of the central office equipment when relay 13CT releases, and locks operated at its secondary winding. Relay 13CT released cuts off the station from the central office line, supplies local battery to the ring lead, and grounds the tip lead. The station now receives busy tone and is unable to complete the call.

When the station disconnects, relay 13S releases. Relay 13S released, releases relay 14SA which releases relay 14SA1. Relay 14SA1 released, releases relay 14SA2 and opens the locking path of relay 13TD causing it to release.

Relay 14SA2 released, releases relay 14SL which removes the holding ground from the crossbar switch causing it to release. On the release of relay 14SA, the inductor is momentarily placed across the tip and ring to hold the central office equipment busy to allow time for contact RS of the station message register scoring unit (not shown) to operate, and for the trunk fully to release. Relay 14SA2 released, releases relays 14SL and 13CT and removes the inductor from across the line. The trunk is now returned to the idle condition and available for another call.

*Station originates call to attendant*

The calling party at station 10, for example, depresses the nonlocking DSK key on the station set which operates the associated 6ST10 relay. Relay 6ST– operated, operates relay 7GT. Relay 7GT operated closes the station gate to the attendant and all other stations by opening the operating path of the 6RM, 6DSS, and all other 6ST– relays. Relay 7GT operated also operates relay 6DSK. Relay 6DSK operated grounds the *dska* lead which operates the one of the "OS–" relays such as relay 20S7 associated with the first idle intercom trunk in the intercom trunk 9SL relay chain (FIGS. 8 and 9). Relay 6DSK operated also operates relay 30S0. The operated 20S7 and 30S0 relays operate the associated select magnets 2SM7 and 3SM0 on each of the four crossbar switches. The select magnets and relay 6ST10 operated, operate hold magnet 4H0 associated with calling station 10. When the hold magnet is operated, relay 4L0 (which was operated when the station went off-hook) releases and the crossbar switch crosspoints between the calling station and the first idle intercom trunk are closed.

Relay 4L0 released, releases relay 6ST10 and relay 6ST10 released, releases the slow release 7GT relay which opens the station gate. Relay 6ST10 released also reeases relay 6DSK, releasing the "OS–" relays which release the associated select magnets.

When the station and the intercom trunk (FIG. 9) are connected, relay 9S operates from the station short. Relay 9S operated, operates relay 9CH if the attendant is idle, grounds the *s* lead to hold the crossbar link associated with the calling station, operates relay 9SL, and grounds the *rst* lead to the common control circuit which starts the tone signal to the attendant or rings the remote answer bell. Relay 9CH operated allows relay 9TA to operate, grounds the *tgt* lead to the common control circuit, and prepares its own locking path. Relay 9SL operated completes a path for audible ringing to the calling station and advances the 9SL relay chain which prevents any other station from seizing this trunk. Relay 9TA operated connects the trunk to the common control circuit, prepares a path to operate relay 90A when the attendant answers, and completes a path to flash the attendant console answer lamp at 120 i.p.m.

When the attendant answers, relay 90A operates to ground on lead *oa* from the common control circuit. Relay 90A operated, operates relay 9AC, provides an auxiliary locking path for relay 9SL, opens lead *rst* which stops the tone signal, and causes the answer lamp to light steady. The attendant and the calling stations are now connected. Relay 9AC operated prevents the 9CH relay from being reoperated, prevents the tone from restarting when the attendant leaves the connection and opens the audible ringing path to the calling station.

To connect the call to another station, the attendant operates the direct station selection key for the desired station. This causes the *dss* lead to be grounded and to operate the proper select magnets in the crossbar link associated with the called staiton. The direct station selection key operated also causes the 9SS relay to operate over lead *dss3*. Relay 9SS operated applies ringing to the *t1* and *r1* leads to ring the called station, completes a path for audible ringing to the calling station and the attendant, and splits the tip and ring between the attendant and the called station.

Ground on the *rls1* lead from the attendant console release key REL is applied to lead *s1* to hold the crossbar link associated with the called station. The attendant can leave the connection when ringing is heard or can remain on the line until the connection is complete. If the attendant disconnects when ringing is heard, relay 90A releases and transfers control of the connection to the calling station. If the attendant remains on the line, the connection is held under control of the REL key.

When the called station answers, relay 9RT operates from the called station short. Relay 9RT operated removes ringing current and audible from the line, releases relay 9SS, and completes a path to ground the *rt* lead to the common control circuit. Relay 9SS released connects the called station to the calling station and the attendant. The attendant, the calling party and the called party are now connected.

To disconnect from the trunk the attendant depresses the switchhook at the console. This causes ground to be removed from the *oa* lead which releases relay 90A. Relay 90A released opens the locking path of relay 9CH causing it to release and transfers control of the called station sleeve from the release key to the 9SL relay. Relay 9CH released causes relay 9TA to release. Relay 9TA released disconnects the trunk from the common control circuit and opens the *ans* lead which extinguishes the answer lamp. The attendant is now disconnected from the trunk and free to handle other calls.

This trunk is held operated until both the calling and the called stations hang up. This occurs because the 9S relay is held operated by either station. When the last station disconnects, relay 9S releases. Relay 9S released, releases relay 9SL and removes ground from the *s* lead which releases the crossbar link associated with the calling station. Relay 9SL released, releases relay 9AC and removes ground from the *s*1 lead which releases the crossbar link associated with the called station. The trunk is now returned to the idle condition.

*Attendant originates intercom call*

To make an intercom call, the attendant removes the receiver from the switchhook and momentarily depresses the RM nonlocking key in the attendant console. The RM key operated, operates relay 5AT which operates relay 6AT1. The operated RM key also operates relay 6RM which locks operated under control of relays 6AT1 operated [contact 6AT1(9)] and 6DSS released [contact 6DSS(12)]. Relay 6RM operated, operates relay 7GT which closes the station gate by opening the operating path of all 6ST–relays and grounds the *rms* lead which seizes the first idle intercom trunk by operating its 9CH relay, for example, over the idle intercom trunk 9SL relay transfer contacts 9SL(9). Relay 6AT1 operated grounds lead *oa* which places the connection between the intercom trunk and the common control under control of the attendant and partially closes through the attendant's talking path. The RM key released, releases relay 5AT and opens the operating path of relay 6RM.

The *rms* lead ground operates relay 9CH. Relay 9CH operated causes relay 9TA to operate. Intercom trunk relay 9TA operated completes a path to operate relay 90A, connects the trunk to the common control circuit, and prepares paths for operating common control relay 6DSS.

When leads *t*2 and *r*2 are closed through to the attendant console, intercom trunk relay 9S operates over the loop bridge by the attendant's telephone. Relay 90A operated locks the 9CH relay operated, operates relay 9S1, operates relay 9AC, grounds the *s*1 lead, and completes a path to light the answer lamp steady at the attendant console.

When the answer lamp lights steady, this indicates, to the attendant, that the trunk is connected to the common control circuit and is ready for direct station selection. To connect to a station, the attendant operates the direct station selection key for the desired station. This key operated connects the called station line to the trunk if the called station is idle and operates relay 9SS. Relay 9SS operated completes a path for ringing current on leads *t*1 and *r*1, opens the tip and ring to isolate ringing current from the attendant, and completes a path for audible ringing to the attendant.

When the called station answers, relay 9RT is operated over the loop from the station. Relay 9RT operated releases relay 9SS, removes ringing current and audible ringing from the line, and grounds the *rt* lead to the common control circuit which causes the attendant's talking path to be condenser coupled to the trunk. The attendant and the called station are now connected.

The attendant disconnects the called station by momentarily depressing the REL nonlocking key at the attendant console. The REL key operated removes ground from the *rls* lead which in turn releases the 4H– hold magnet, opening the crossbar switch crosspoint connection to the called station, releases relay 7BK1, and causes the trunk to release relay 7RT which operated if the called station answered before the attendant released the station line.

The attendant after releasing the REL key places the receiver on the switchook. The 6AT1 relay releases causing the trunk to release and opens the trunk gate to the attendant by releasing relay 7TGT.

When the attendant and a station are connected, the attendant can put the call on hold by operating the H1 or H2 key at the attendant console. Operation of the H1 key, for example, lights the H1 lamp steady and grounds lead *ho*1 to operate intercom trunk relay 9H1. Relay 9H1 operated, operates relay 9HA, causes relay 9TA to release, and locks operated to lead *hl*1. Relay 9HA operated releases relay 9CH and provides an auxiliary holding path for relay 9SL. Relay 9TA released extinguishes the answer lamp and disconnects the trunk from the common control circuit causing relay 90A to release.

The trunk is now held and the attendant is disconnected from the trunk and free to handle other calls. When the attendant again operates the H1 key, the H1 lamp is extinguished and the *chr*1 lead is grounded causing the 9TA relay to reoperate. At the same time, ground is removed from lead *hl*1 causing relay 9H1 to release. When the 9TA relay operates, the trunk and common control circuit are again connected which causes relay 90A to operate. Relay 90A operated completes a path to operate the answer lamp steady. Relay 9H1 released, releases relay 9HA. The attendant and the station are thus re-established in talking relationship.

*Station originates toll call*

When a PBX station takes the receiver off the hook and operates the LD key, the 6LD relay in the common control circuit operates. The 6LD relay operated, operates the proper select magnets to connect the station to the first idle toll operator trunk in the same manner as that described above for local calls. The station connected to the trunk causes toll trunk relay 11S to operate over the short from the station. Relay 11S operated, operates relay 11SA and grounds the sleeve to hold the crossbar switch. Relay 11SA operated grounds the ring of the trunk to signal the toll operator, operates relays 11SL and 11RBC, and completes a path to return ringing tone to the station. Relay 11RBC operated opens the ringing bridge across the tip and ring. Relay 11SL operated advances the 11SL relay chain so that any other station originating a toll call will seize the next idle trunk, and provides an auxiliary holding path for relay 11CT and for the sleeve to the crossbar switch. When the toll operator answers, relay 11L operates on its primary winding from ground on the tip lead. Relay 11L operates relay 11LA. Relay 11LA operated, operates relay 11CT and provides auxiliary holding paths for relays 11RBC and 11SL. Relay 11CT operated connects the station and toll ends of the trunk together, releases relay 11L, and removes ringing tone from the line. Relay 11L released, releases relay 11LA. The station and toll operator are now connected.

When the calling party, as just discussed, depressed the nonlocking LD key on the station set, the associated one of relays 6ST– operated. The 6ST– relay operated, operates relay 7GT. Relay 7GT operated closes the station gate to the attendant and all other stations by opening the operating path of the 6RM, 6DSS, and all other 6ST– relays and also operates relay 6LD. Relay 6LD operated grounds the *lda* lead which operates the one of the "OS–" relays, such as relay 3OS2, that is associated with the first idle toll operator trunk in the toll operator trunk 11SL– relay chain. Relay 6LD operated also operates relay 3OS1. The operated 3OS2 and 3OS1 relays, for example, operate the associated select magnets 3SM2 and 3SM1 on each of the four crossbar switches. The select magnets and the 6ST– relay operated, operate the 4H– hold magnet associated with the calling station. When the hold magnet is operated, it releases the calling station's 4L– relay and closes crossbar switch crosspoints between the calling station and the first idle toll operator trunk. Relay 4L– released, releases relay 6ST– which in turn releases the slow release 7GT relay to open the station gate. Relay 4L– released also releases relay 6LD to release the "OS–" relays which in turn release the "SM–" select magnets.

When the station hangs up, relays 11S and 11SA release. When the 11SA relay releases, relays 11L and 11LA operate to hold the trunk busy until the toll operator disconnects. When the toll operator disconnects, relays 11L and 11LA release, causing relays 11SL, 11CT, and 11RBC to release in that order and to return the trunk to the idle condition.

*Attendant makes toll call*

To make a toll call, the attendant removes the receiver from the switchhook and operates the LD key at the attendant console which tests the 11SL relay chain to find the first idle trunk. When an idle 11SL relay is found, the toll trunk 11LD relay operates. Relay 11LD operated, operates relay 11CH. Relay 11CH operated, operates relay 11TA. Relay 11TA operated connects the trunk to the common control circuit, completes a path to operate relay 110A, and prepares a path to light the attendant console answer lamp. Relay 110A operated grounds the ring of the trunk to signal the toll operator, lights the answer lamp steady, operates relays 11SL and 11RBC, and returns audible ring to attendant. When relay 11SL operates, the 11SL relay chain is advanced to prevent any station from seizing the trunk. Relay 11RBC operated removes the ringing bridge from the line. When the toll operator answers, ground is returned on the tip of the trunk which allows relay 11L to operate on its primary winding. Relay 11L operates relay 11LA. Relay 11LA operated, operates relay 11CT and provides a locking path for relay 11RBC. Relay 11CT operated connects the tip and ring of the trunk to the attendant console, releases relay 11L, removes audible ring from the line, and provides auxiliary locking paths for relays 11RBC and 11SL. Relay 11L released, releases relay 11LA. The connection is now completed between the attendant and the toll operator.

After hte attendant and a toll operator are connected, the attendant may hold the call by operating the H1 or H2 key at the console. The H1 key operated, for example, lights the H1 lamp steady and grounds the *ho*1 lead to operate toll trunk relay 11H1. Relay 11H1 operated, operates relay 11HA, releases relay 11TA, and lock itself to the *hl*1 lead. Relay 11HA operated puts an inductor across the tip and ring as a holding bridge, releases relay 11CH, and holds relay 11SL operated. Relay 11TA released extinguishes the answer lamp, disconnects the trunk from the common control circuit, and releases relay 110A. Relay 110A released, releases relay 11LD. The attendant is now disconnected from the trunk. When the attendant again operates the H1 hold key, the hold lamp is extinguished and the *chr*1 lead is grounded causing the 11TA relay to operate. At the same time ground is removed from lead *hl*1 causing relay 11H1 to release. Relay 11TA operated connects the trunk to the common control circuit and completes a path to operate relay 110A. Relay 11H1 released, releases relay 11HA. Relay 11HA released removes the holding bridge from the trunk. Relay 110A operated lights the answer lamp steady and locks the 11SL relay operated. The attendant and toll operator are again connected.

When the attendant disconnects, ground is removed from leads *oa* and *chr*1 causing relays 110A and 11TA to release. Relay 110A releases relay 11SL which releases relay 11CT. Relay 11CT releases relay 11RBC which puts the ringing bridge back across the line and restores the trunk to the idle condition.

If the toll operator and a station are connected and the station hangs up, relays 11S and 11SA release. When relay 11SA releases, relay 11L is placed across the line and operates from central office battery and ground. Relay 11L operates relay 11LA. Relay 11LA holds relay 11SL operated which holds the connection under control of the toll operator. The toll operator can now ring back on the line and ring the station bell. If the toll operator disconnects after the station hangs up, the trunk releases. If the toll operator reseizes the trunk and rings, relay 11R will operate from ringing current and relay 11L will operate from central office battery and ground. Relay 11R operates relay 11R1 and relay 11L operates relay 11LA. Relay 11LA operates before relay 11R1 and causes relays 11SL and 11CT to operate. Relay 11R1 operated grounds lead *rst* to sound tone at the console or to ring the remote answer bell, operates relay 11CH, and provides holding paths for relays 11CT and 11SL. Relay 11SL operated provides a locking path for relay 11CT and advances the 11SL relay chain so that any station originating a toll call will seize the next idle trunk. Relay 11CT operated prepares a path to connect the tip and ring of the toll trunk to the common control circuit. Relay 11CH operated, operates relay 11TA which completes the connection of the trunk and common control circuit. Relay 11TA operated allows relay 110A to operate when the attendant answers and flashes the answer lamp at 60 i.p.m. Relay 110A operated releases relay 11R1, causes the answer lamp to change from 60 i.p.m. flash to steady, takes over the holding path of relay 11SL, provides a locking path for relay 11CH, causes relay 11L to release which releases relay 11LA, and operates relay 11RBC. Relay 11RBC operated removes the ringing bridge across the line. The attendant and the toll operator are now connected.

When the attendant hangs up, relay 110A releases. Relay 110A released, releases relay 11CH and allows relay 11L to operate. Relay 11CH released, releases relay 11TA. Relay 11L operates relay 11LA to hold the trunk busy until the toll operator disconnects. When the toll operator disconnects, relays 11L, 11LA, 11SL, 11CT, and 11RBC release in that order. Relay 11RBC released restores the ringing bridge across the line and the trunk is returned to the idle condition.

It is to be understood that the above-described arrangements are merely illustrative of the principles of this invention and various other arrangements may be devised by those skilled in the art without departing from the spirit and scope of the invention.

What is claimed is:

1. A telephone system comprising a plurality of lines and trunks, at least one of said trunks being an answering trunk, an attendant console, switching means normally controllable from said attendant console to connect a calling one of said trunks with any of said lines, means settable at said attendant console for automatically connecting a calling one of said plurality of trunks with said answering trunk, station circuit means associated with said lines, said station circuit means including a plurality of keys selectively operable to answer said calling one of said trunks over said answering trunk, said plurality of keys being sequentially operable temporarily to render said answering trunk unselectable by any other of said lines, and means thereafter controllable over the one of said lines selecting said answering trunk for operating said switching means to call any other one of said lines.

2. A telephone system according to claim 1 wherein said station circuit means includes a key telephone set and wherein said plurality of keys includes a switchhook exclusion key and a trunk selecting key, said trunk selecting key normally being operable to select an idle one of said plurality of trunks and said exclusion key being operable in conjunction with said trunk selecting key to select said answering trunk instead of said idle one of said trunks.

3. A crossbar telephone switching system comprising a plurality of crossbar switches, a plurality of extension stations and two-way trunks appearing on said crossbar switches, means at said stations for operating said crossbar switches to originate a call over an idle one of said two-way trunks, means operable by any calling one of said two-way trunks having a call for one of said stations for initiating a connection thereto through said crossbar switches and for simultaneously rendering said trunk nonselectable to call-originating ones of said stations, answer trunk means appearing in said crossbar switches, means for extending a connection to said answer trunk from any of said calling two-way trunks having a call for one of said stations, and means at said stations for operating said crossbar switches to connect said answer trunk to the answering one of said stations for answering said calling trunk having said call for one of said stations.

4. A crossbar telephone switching system according to claim 3 wherein said means for operating said crossbar switches comprises means controlled by said answering one of said stations for re-operating said crossbar switches to connect said calling trunk with another of said stations.

5. A telephone system comprising a plurality of trunks and stations, switching means for interconnecting said trunks and said stations, attendant console circuit means for controlling said switching means, means normally responsive to the calling condition of any of said trunks for seizing said attendant console circuit means to connect the calling one of said trunks thereto, means operable to render said responsive means effective to indicate said calling condition to said stations, means at each of said stations for selecting an idle one of said trunks, exclusion circuit means operable at any one of said stations for seizing said responsive means through one of said trunks selected at a station to connect said calling one of said trunks to said station, and means for controlling said switching means from said station to connect said calling trunk with any other one of said stations.

6. A crossbar private branch exchange comprising a plurality of lines and trunks, a common control circuit selectable by any calling one of said trunks, an attendant console circuit for answering calls arriving over trunks having selected said common control circuit, an answer trunk selectable by any of said stations, means operable at said attendant console for automatically extending cases arriving over said calling trunks from said common control circuit to said answer trunk when said console will be unoccupied, station selection means at said common control circuit for operating said crossbar switches to connect said calling trunks to said stations, and dial-operated call completion means at said answer trunk controllable by any station having selected said answer trunk for operating said station selection means.

7. A crossbar private branch exchange according to claim 6 wherein said station selection means includes a plurality of leads for each digit of a station number, a lead of each said plurality being simultaneously selectable by said attendant console circuit and sequentially selectable by said answer trunk dial-operated call completion means.

8. A private branch exchange telephone system comprising crossbar switching means, a plurality of two-way trunks connected to said switching means, a plurality of stations, an attendant console, an answer trunk, means including first key means at said stations for operating said switching means to connect said stations to said console, means including second key means at said stations for operating said switching means to connect said stations to said two-way trunks, station selection means at said console for connecting said two-way trunks to said stations, means for connecting a calling one of said two-way trunks to said answer trunk, and means including station exclusion key means and dialing means at said stations for causing operation of said station selection means from any of said stations to connect said answer trunk to one of said stations.

References Cited

UNITED STATES PATENTS

| | | | |
|---|---|---|---|
| 2,056,752 | 10/1936 | Voss | 179—27 |
| 2,788,393 | 4/1957 | Armstrong | 179—27 |
| 3,176,080 | 3/1965 | Gatzert et al. | 179—27 |
| 3,180,942 | 4/1965 | Matthews | 179—27 |

KATHLEEN H. CLAFFY, *Primary Examiner.*

WILLIAM C. COOPER, *Examiner.*